United States Patent
Yeatman, Jr. et al.

(10) Patent No.: US 8,867,827 B2
(45) Date of Patent: Oct. 21, 2014

(54) SYSTEMS AND METHODS FOR 2D IMAGE AND SPATIAL DATA CAPTURE FOR 3D STEREO IMAGING

(71) Applicant: ShapeQuest, Inc., Scottsdale, AZ (US)

(72) Inventors: Hoyt H. Yeatman, Jr., Santa Rosa Valley, CA (US); Gary Robertson, Scottsdale, AZ (US)

(73) Assignee: Shapequest, Inc., Scottsdale, AZ (US)

(*) Notice: Subject to any disclaimer, the term of this patent is extended or adjusted under 35 U.S.C. 154(b) by 0 days.

(21) Appl. No.: 14/089,300

(22) Filed: Nov. 25, 2013

(65) Prior Publication Data
US 2014/0098199 A1    Apr. 10, 2014

Related U.S. Application Data

(63) Continuation of application No. 12/932,789, filed on Mar. 7, 2011, now abandoned.

(60) Provisional application No. 61/312,330, filed on Mar. 10, 2010.

(51) Int. Cl.
| | | |
|---|---|---|
| G06K 9/00 | (2006.01) | |
| H04N 13/04 | (2006.01) | |
| H04N 13/02 | (2006.01) | |
| G06T 7/00 | (2006.01) | |
| H04N 13/00 | (2006.01) | |

(52) U.S. Cl.
CPC ....... *H04N 13/0239* (2013.01); *H04N 13/0425* (2013.01); *H04N 13/0271* (2013.01); *G06T 7/0075* (2013.01); *H04N 13/00* (2013.01); *H04N 13/026* (2013.01); *G06T 2207/10012* (2013.01); *H04N 13/0242* (2013.01)
USPC ........................................................ 382/154

(58) Field of Classification Search
None
See application file for complete search history.

(56) References Cited

U.S. PATENT DOCUMENTS
| | | | |
|---|---|---|---|
| 5,675,377 A | 10/1997 | Gibas | |
| 5,745,126 A | 4/1998 | Jain et al. | |

(Continued)

FOREIGN PATENT DOCUMENTS
| | | |
|---|---|---|
| WO | WO 2006/024091 | 3/2006 |
| WO | WO 2008/033856 | 3/2008 |
| WO | WO 2009/093136 A2 | 7/2009 |

OTHER PUBLICATIONS

Kim et al, "Image-based panoramic 3D virtual environment using rotating two multiview cameras," Image Processing, 2003. ICIP 2003. Proceedings. 2003 International Conference on (Vol. 1 ), pp. 9170-9120 (Sep. 2003).

(Continued)

*Primary Examiner* — Anand Bhatnagar
*Assistant Examiner* — Soo Park
(74) *Attorney, Agent, or Firm* — Opticus IP Law PLLC

(57) ABSTRACT

Systems and methods for 2D image and spatial data capture for 3D stereo imaging are disclosed. The system utilizes a cinematography camera and at least one reference or "witness" camera spaced apart from the cinematography camera at a distance much greater that the interocular separation to capture 2D images over an overlapping volume associated with a scene having one or more objects. The captured image data is post-processed to create a depth map, and a point cloud is created form the depth map. The robustness of the depth map and the point cloud allows for dual virtual cameras to be placed substantially arbitrarily in the resulting virtual 3D space, which greatly simplifies the addition of computer-generated graphics, animation and other special effects in cinemagraphic post-processing.

16 Claims, 20 Drawing Sheets

(56) References Cited

U.S. PATENT DOCUMENTS

| | | | |
|---|---|---|---|
| 5,850,352 | A | 12/1998 | Moezzi et al. |
| 6,002,743 | A | 12/1999 | Telymonde |
| 6,028,348 | A | 2/2000 | Hill |
| 6,084,979 | A | 7/2000 | Kanade et al. |
| 6,268,846 | B1 | 7/2001 | Georgiev |
| 6,515,659 | B1 | 2/2003 | Kaye et al. |
| 6,677,982 | B1 | 1/2004 | Chen et al. |
| 6,686,926 | B1 | 2/2004 | Kaye |
| 6,791,540 | B1 | 9/2004 | Baumberg |
| 6,791,598 | B1 | 9/2004 | Luken et al. |
| 6,816,629 | B2 | 11/2004 | Redlich |
| 6,903,735 | B2 | 6/2005 | Jeong et al. |
| 7,058,239 | B2 | 6/2006 | Singh et al. |
| 7,085,409 | B2 | 8/2006 | Sawhney et al. |
| 7,102,633 | B2 | 9/2006 | Kaye et al. |
| 7,116,323 | B2 | 10/2006 | Kaye et al. |
| 7,116,324 | B2 | 10/2006 | Kaye et al. |
| 7,187,809 | B2 | 3/2007 | Zhao et al. |
| 7,307,654 | B2 | 12/2007 | Chang |
| 7,551,770 | B2 | 6/2009 | Harman |
| 7,573,475 | B2 | 8/2009 | Sullivan et al. |
| 8,090,194 | B2 * | 1/2012 | Golrdon et al. ............... 382/154 |
| 8,208,719 | B2 * | 6/2012 | Gordon et al. ............... 382/154 |
| 8,538,166 | B2 * | 9/2013 | Gordon et al. ............... 382/201 |
| 2001/0043737 | A1 | 11/2001 | Rogina et al. |
| 2002/0118958 | A1 | 8/2002 | Ishikawa et al. |
| 2003/0026460 | A1 | 2/2003 | Conrad et al. |
| 2003/0202120 | A1 | 10/2003 | Mack |
| 2004/0036763 | A1 | 2/2004 | Swift et al. |
| 2005/0286759 | A1 | 12/2005 | Zitnick et al. |
| 2007/0147671 | A1 | 6/2007 | Di Vincenzo et al. |
| 2007/0183653 | A1 | 8/2007 | Medioni et al. |
| 2007/0296721 | A1 | 12/2007 | Chang et al. |
| 2007/0296809 | A1 | 12/2007 | Newbury |
| 2008/0150945 | A1 | 6/2008 | Wang et al. |
| 2009/0003686 | A1 | 1/2009 | Gu |
| 2009/0116732 | A1 | 5/2009 | Zhou et al. |
| 2010/0026784 | A1 | 2/2010 | Burazerovic |
| 2010/0118117 | A1 | 5/2010 | Kroll et al. |
| 2010/0259539 | A1 | 10/2010 | Papanikolopoulos et al. |
| 2010/0315488 | A1 | 12/2010 | Kim et al. |
| 2011/0026808 | A1 | 2/2011 | Kim et al. |
| 2011/0225523 | A1 | 9/2011 | Newton et al. |
| 2011/0316980 | A1 * | 12/2011 | Dubbelman et al. ............ 348/47 |

OTHER PUBLICATIONS

Evers-Senne, et al., "Image-based interactive rendering with view dependent geometry," Computer Graphics Forum, vol. 22, issue 3, pp. 573-582 (Sep. 2003).
Waschbusch et al., "Scalable 3D video of dynamic scenes," The Visual Computer, vol. 21, Issue 8-10, pp. 629-638 (Sep. 2005).
Fuchs et al., "Virtual space teleconferencing using a sea of cameras," Proc. First Int. Conf. on Medical Robotics and Computer-Assisted Surgery.
Penard et al., "3D building façade reconstruction under mesh form from multiple wide angle views," Proc. of the ISPRS Commission V/4 Workshop 3D ARCH, vol. XXXVI, part 5/W17 (2005).
Shakhnarovich et al., "Integrated face and gait recognition from multiple views," Computer Vision and Pattern Recognition 2001, Proc. 2001 IEEE Computer Society Conference vol. 1, pp. I-439-I-446 (2001).
Matthies et al., "A photo-realistic 3-D mappings system for extreme nuclear environments: Chornobyl," Proc. of the 1998 IEEE/RSJ, Int. Conf. on Intelligent Robots and Systems, 1998.
Izquierdo et al., "Image-based rendering and 3D modeling: A complete framework," Signal Processing: Image Communications 15 (2000) 817-858.
Gill et al., "Polygonal meshing for 3D stereo video sensor data," Canadian Conference on Computer and Robot Vision, 2008.

* cited by examiner

240DM

SYSTEMS AND METHODS FOR 2D IMAGE AND SPATIAL DATA CAPTURE FOR 3D STEREO IMAGING

CROSS-REFERENCE TO RELATED APPLICATIONS

This application is a continuation of and claims the benefit of priority from U.S. patent application Ser. No. 12/932,789, filed on Mar. 7, 2011, which application is incorporated by reference herein and which claims the benefit of priority under 35 U.S.C. §119(e) of U.S. Provisional Application Ser. No. 61/312,330, filed on Mar. 10, 2010, which application is incorporated by reference herein.

FIELD

The present disclosure relates generally to creating three-dimensional (3D) stereo images from two-dimensional (2D) photography, and in particular to systems and methods for 2D image capture and spatial data capture for 3D stereo imaging.

BACKGROUND ART

The process of "converting" 2D photographed images into three-dimensional 3D stereo images (left eye and right eye pairs) for the motion picture and television industry is extremely labor intensive, time consuming, financially expensive, and has the added problem of being geometrically inaccurate to the original scene.

Current technologies allow for the creation of 3D stereo imaging from 2D photography. However, the available 3D technologies do so through interpretive and creative means, or through system configurations that do not capture the true depth and geometry of the original environment using the 2D photography. For example, a conventional and popular technology used to make a 3D stereo image (or a 3D movie, which is a sequence of 3D stereo images) is to use two cameras separated by the typical human interocular distance $D_H$ (i.e., human eye spacing), which is assumed in the industry to be about 68 mm, though smaller distances $D_H$ are often used for reasons described below. The two cameras are then oriented (angled) so that their fields of view converge and overlap at a distance DS where the various objects in the scene being filmed are located. While this allows for creation of a 3D effect, the actual image-capture process does not collect a substantial amount of true 3D information for the given scene mainly because the interocular distance $D_H$ is too small relative to the distance $D_S$. Said differently, the amount of spatial (3D) data captured by such an arrangement is far smaller than the actual 3D volume of the scene being imaged.

This lack of accurate volumetric data and true 3D geometry provides significant problems and challenges when visual effects such as computer-generated elements need to be added to the photographed or filmed scenes. Complex visual effects scenes in 3D stereo that incorporate live action captured using a conventionally two-camera 3D imaging system require critical stereo decisions to be made at the time of filming, such as the aforementioned convergence angles and interocular distances.

In addition, certain types of image post-processing require the full 3D spatial data to be captured to facilitate removing artifacts in the captures scene. For example, in movies it is not uncommon to have to remove an unwanted jet contrail from an outdoor scene. In 2D movie (cinemagraphic) post-processing, this is a straightforward operation. However, in 3D movie post-processing, the jet contrail is also in 3D and thus is much more difficult to remove.

Because of the limitations of present-day 3D imaging technology, critical 3D-stereo-related decisions must made at the time of shooting rather than in post-production. However, it would be much preferred to be able to make such decisions in post-processing to optimize the camera positions relative to the surrounding cuts of the film. The addition of visual effects in the form of computer-graphics (CG) environments and CG characters into scenes that have been originally shot in 2D and converted into 3D stereo further complicates matters and poses great technical and financial challenges to visual effects post-production.

It would thus be of tremendous benefit to be able to reduce the time and expense presently associated with adding CG environments and CG characters to a 3D stereo movie as part of the movie post-processing.

SUMMARY

An aspect of the disclosure is a method of converting 2D images of a scene having therein at least one object to one or more 3D images of the scene. The method includes simultaneously capturing at least first and second 2D images of the scene from corresponding at least first and second cameras having respective camera positions and orientations measured relative to a reference coordinate system. The method also includes forming a disparity map from the at least first and second 2D images, wherein the disparity map has a gray scale that corresponds to distance information of the at least one object relative to the reference coordinate system. The method also includes forming from the disparity map a 3D point cloud P(x, y, z) representative of the at least one object, wherein the point cloud is configured to support first and second virtual cameras to create a stereo camera pair arrangeable in substantially arbitrary virtual locations.

Another aspect of the disclosure is a method of forming a distance representation of a scene from 2D images of the scene. The method includes simultaneously capturing at least first and second 2D images of the scene from corresponding at least first and second cameras having respective camera positions and orientations measured relative to a reference coordinate system. The method also includes defining one or more regions of interest in the at least first and second 2D images. The method further includes associating differences between pixels in the at least first and second cameras with distances from a reference point, and assigning different gray-scale intensities to different ones of the distances.

An aspect of the disclosure includes creating a depth map or "disparity map" using gray-scale variations to represent distances from the camera (or reference coordinates) associated with one or more objects in the scene. The process of creating the disparity map can be made semi-automatic using image data from multiple calibrated cameras. The range data in the disparity map is transformed to match the perspective and viewing frustum of the cinemagraphic ("cine") camera. The 2D photographed image from the cine camera is embedded with the range data at sub-pixel accuracy to facilitate post-production to create an accurate and more continuous 3D stereo pair from this true 3D data.

The range data can also be expressed as a "point cloud" P(x, y, z) representing spatial positions of thousands of points (pixols) in three-space that make up the 3D scene. In a particular example, the position and placement of every pixel in the cine camera in 3-space is computed with 16-bit color information.

Alternatively, the range data can be expressed as a polygonal mesh PM(x, y, z; RGB) of spatial positions and the corresponding RGB color, which allows the 2D photographed images from the cine camera to be mapped directly on to the mesh in motion as texture. The textured 3D geometry can then be re-imaged with virtual cameras in post-production, setting the appropriate interocular distance and convergence values for the scene, thus creating a true left and a true right eye stereo pair for theatrical viewing.

Multiple cameras with relatively large separations (i.e., typically much greater that the interocular separation of about 65 mm) are configured to capture 2D images over their respective field of views and over an overlapping volume associated with a scene having one or more objects. One or more of the cameras serve as reference or "witness" cameras that allow for accurate range data determination using photogrammetry techniques to calculate the object distances. The witness cameras are synchronized with respect to the shutter of the main cine camera.

The addition of CG visual effect elements is simplified by the present disclosure because the systems and methods result in the creation of a virtual 3D geometry of the location and allows for dual virtual cameras to be placed substantially arbitrarily in the virtual 3D space.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure.

Figure 1:
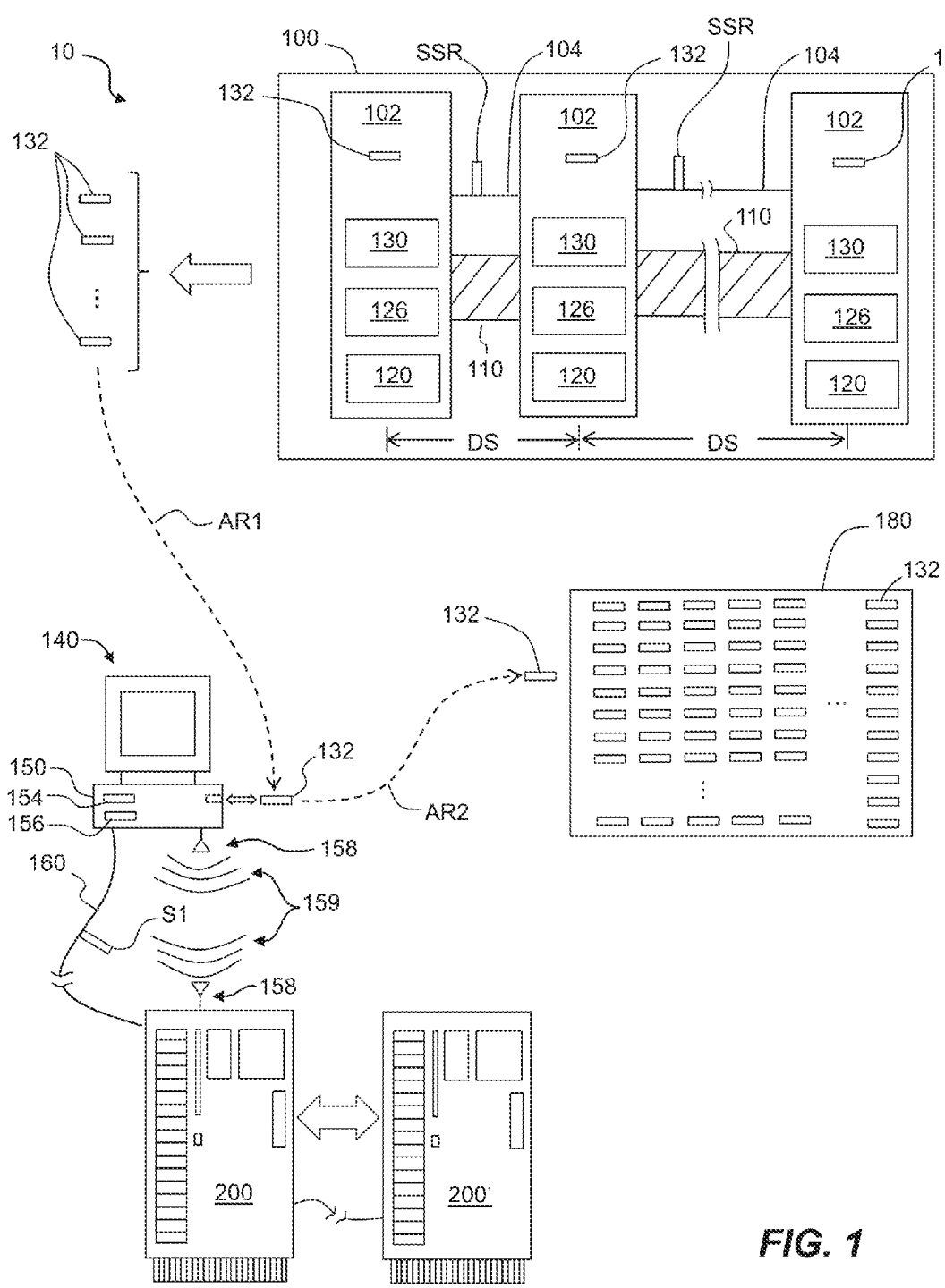
FIG. 1 is a generalized schematic diagram of the 3D stereo imaging system of the present disclosure.

The various elements depicted in the drawing are merely representational and are not necessarily drawn to scale. Certain sections thereof may be exaggerated, while others may be minimized. The drawing is intended to illustrate an example embodiment of the disclosure that can be understood and appropriately carried out by those of ordinary skill in the art.

DETAILED DESCRIPTION

The present disclosure relates generally to creating three-dimensional (3D) stereo images from two-dimensional (2D) photography, and in particular to systems and methods for 2D image capture and post-processing for 3D stereo imaging. The disclosure sets forth an overview of the 3D stereo imaging system and its components. The various components of the 3D stereo imaging system are then described in greater detail. Then, a variety of embodiments of the methods of the disclosure based on the operation of the 3D stereo imaging system are described. The terms "right" and "left" as applied to the witness cameras are relative to the 3D imaging system and its view of the scene.

Various algorithms used to carry out the systems and methods of the invention are described herein along the way, and are also set forth in more detail in an "algorithms" section toward the end of this Detailed Description.

3D Stereo Imaging System

Figure 2:
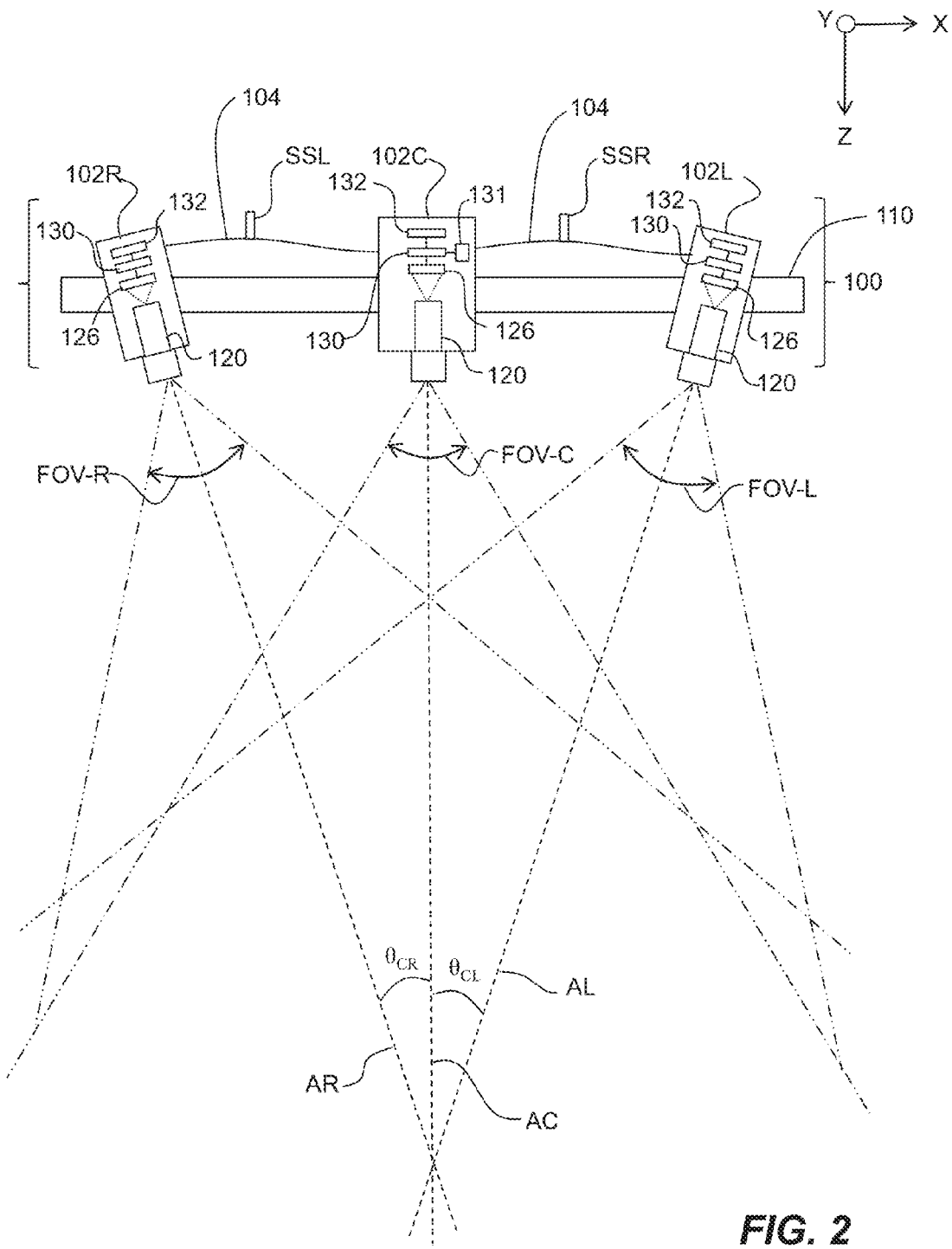
FIG. 2 is a close-up, top-down schematic diagram of an example camera system that includes three cameras, namely a left camera, a center camera and a right camera.

FIG. 1 is a generalized schematic diagram of the 3D stereo imaging system ("3D system") 10 of the present disclosure. 3D system 10 includes a camera system 100 that has two or more cameras 102 spaced apart from its adjacent camera by respective distances DS, which need not be the same. FIG. 2 is a close-up, top-down schematic diagram of an example camera system 100 that includes three cameras 102, namely a left camera 102L, a center camera 102C and a right camera 102R (Cartesian coordinates are shown for reference).

In an example, one of cameras 102 is a cinemagraphic camera ("cine camera" or alternatively, "motion picture camera" or "production camera") while the other one or more cameras are reference or "witness" cameras, e.g., cameras 102L and 102R. The cine camera 102C (assumed hereinbelow to be center camera 102C for convenience) is thus used to capture images of the scene as contemplated by a director while the witness cameras are used to capture the 3D information relative to the cine camera.

Cameras 102 are operably connected to one another via communication lines 104, which may be optical or electrical or wireless, for example. Cameras 102 may also be mechanically connected to one another via a camera support device 110. Each camera 102 includes an imaging lens 120 with an associated field of view FOV, an image sensor 126, camera electronics 130 and a computer-readable medium 132, which in an example is in the form of a removable memory storage device ("removable memory"), such as a memory CF card, flash memory stick, CD ROM, etc. Computer-readable medium 132 is referred to below as removable memory for the sake of description. The operation of cameras 102 is synchronized as described in greater detail below.

3D system 10 further includes a data reading device 140 for reading data stored in removable memories 132. In an example, data reading device 140 includes a computer 150. Computer 150 includes a port 152, a processor 154 and a memory module 156. Port 152 is configured to receive removable memory 132 and read and store the contents of the removable memory in memory module 156.

3D system 10 also includes a removable-memory storage unit 180 where removable memories 152 are physically stored after use, as described below. An example removable-memory storage device 180 is a secure drawer or safe.

3D system 10 further includes a primary data storage unit 200 such as a server, and an optional back-up or secondary storage unit 200', such as another server. In an example, primary data storage unit 200 and secondary storage unit 200' are operably linked via a communication link 202, and further in the example are configured to store a petabyte or more of data. In an example, secondary storage unit 200' is mirrored to primary storage unit 200. Primary data storage unit 200 optionally includes an antenna system 158 for wireless EM data communication with computer 150. Primary data storage unit 200 may be operably linked to computer 150 via Ethernet cable 160.

Figure 3:
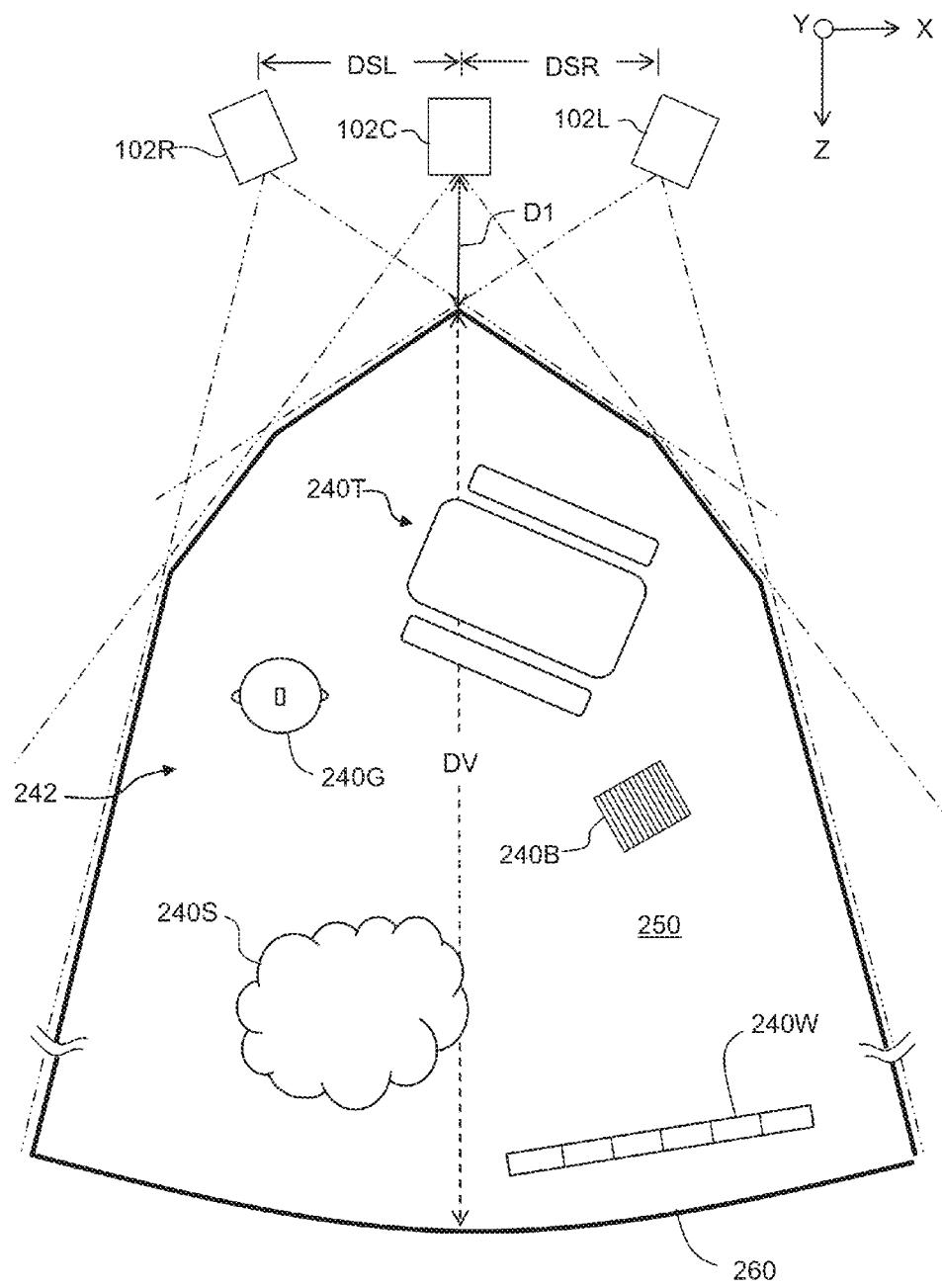
FIG. 3 is a close-up, top-down view of the overlapping fields of view FOV of the three cameras of the camera system shown in FIG. 2, and illustrates a cross-section view of the volume of space covered by the camera system, wherein a scene that includes a number of different objects within the volume.

In the general operation of 3D system 10, cameras 102 each capture a raw 2D image, or a sequence of raw images of a scene over a volume 250 (see FIG. 3). In an example, the captured raw images are filtered (e.g., pre-Bayer filtered) by respective camera electronics 126. The filtered images are then time-coded, frame-coded and camera-coded and stored in their respective removable memories 132.

Removable memories 132 are removed from their respective cameras 102 (e.g., when the removable memories are full or nearly full) and with reference to arrow AR1, are transferred to the location of computer 150. Each removable memory 132 is then inserted into port 152 and computer 150 reads the filtered image data stored therein, and stores the filtered image data in memory module 156. With reference to arrow AR2, the removable memories are then delivered to removable-memory storage unit 180 for storage.

Meanwhile, the filtered image data in memory module 156 of computer 150 is pre-processed by processor 154 to create viewable images. In an example, the viewable images have the largest possible dynamic range and are color-corrected (neutral). Further, the pre-processing by processor 154 may also be performed to enhance the captured scene details. The pre-processing may be performed later on in the same computer 150 or on a different computer.

The viewable image data stored in memory module 156 is transferred to primary data storage unit 200, e.g., via Ethernet cable 160 or via wireless EM antennae systems 158 and wireless signals 159. Primary data storage unit 200 optionally communicates with secondary data storage unit 200' to mirror the storage of the viewable image data for redundancy. The viewable image data include 2D range data from each of the one or more witness cameras 102 and also includes 2D scene data (cinemagraphic images) from the cine camera 102C.

Once all of the viewable image data is collected in primary data storage unit 200, it is post-processed as described in greater detail below. However, unlike data collected using prior art 3D systems, the viewable image data stored in data storage unit 200 includes the full volumetric (3D) information of the captured scene within volume 250, which allows for robust post-processing of the viewable images. In particular, the viewable image data allows for substantially arbitrary virtual camera placement in the captured scene during post-processing, which greatly enhances the ability to create visual effects using CG animation in forming 3D stereo images, including 3D stereo movies.

Computer

In an example, computer 150 is programmable with instructions (e.g., software) embodied in a computer-readable medium to cause the computer to perform the various functions and carry out various aspects of the methods described herein in greater detail below. In an example, computer 150 is a dedicated computer used only to read filtered image data from removable memories 132, pre-process the filtered data to form viewable image data, and transfer the viewable image data to primary data storage unit 200.

As used herein, the term "computer-readable medium" refers to any medium such as removable memory 132 and memory module 156 that can store data and instructions, and that optionally participates in providing instructions to processor 154 for execution. Such a medium may take many forms, including but not limited to, non-volatile media, volatile media, and transmission media. Non-volatile media include, for example, optical or magnetic disks, such as any of the storage devices in any computer(s) operating as a server platform. Volatile media include dynamic memory, such as main memory of a computer platform. Physical transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. In an example, computer 150 includes an antenna system 158 for wireless electromagnetic (EM) data transmission via EM waves 159, and also in an example includes an Ethernet cable 160 for wired data transmission via EM data signals S1.

Common forms of computer-readable media therefore include, for example: a floppy disk, a flexible disk, a hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, so-called "thumb drives," any other memory chip or cartridge, a carrier-wave transporting data or instructions, cables or links transporting such a carrier wave, or any other medium from which a computer can read programming code and/or data. Many of these forms of computer readable media may be involved in carrying one or more sequences of one or more instructions to a processor for execution.

Camera System

With reference to FIG. 2, each camera 102 in camera system 100 has a field of view FOV centered on its optical axis, with left camera 102L having a field of view FOV-L and an optical axis AL, center camera 102C having a field of view FOV-C and an optical axis AC, and right camera 102R having a field of view 102R and an optical axis AR.

FIG. 3 is a close-up view of the overlapping fields of view FOV of the three cameras 102 of camera system 100, and illustrates a top-down view of a scene that includes example objects 240 in the form of a picnic table 2401, a garbage can 240G, a barbeque 240B, a shrub 240S and a block wall 240W. The fields of view FOV are three-dimensional frustums, each covering a volume of space. The field of view FOV in the X-Z plane need not be the same in the Y-Z plane, and the fields of view of the cameras can be different. Cameras 102 are configured so that their fields of view FOV all start to overlap at some distance D1 from center camera 102C, with the overlapping fields of view defining a common volume 250 of space associated with a scene being imaged by each camera from a different orientation (i.e., convergence angle). A cross-section of the volume 250 is shown in FIG. 3.

In an example, volume 250 is in part defined by an outer boundary 260 at a distance DB=DV+D1 from center camera 102C. Outer boundary 260 is generally defined by the camera spacings DSL and DSR and convergence angles $\theta_\alpha$ and $\theta_{CR}$ and represents the limit at which accurate 3D volumetric information can be obtained with cameras 102. Having such an outer boundary on volume 250 usually does not present a problem for most 3D stereo imaging applications because the emphasis of the 3D effect is usually on the objects within the foregrounds of the volume while distant objects are generally treated as background.

In an example, camera spacings DS are defined by the object-to-camera distance. A good ratio of the object-to-camera distance DC as compared to the camera spacing DS (i.e., DS/DC) is about 1:6, with about 1:10 representing an example minimum ratio. However, greater ratios, such as 1:4, can be used.

It is noted here that even though the distance between human eyes is about 68 mm, the distance normally used between conventional stereo cameras (called the "interaxial distance") is sometimes much less. This is because the stereographer is often asked to compromise between creating good stereo separation of objects in a scene and producing comfortable viewing stereo without causing the many artifacts that come with an extended stereo effect. A good rule of thumb for a normal the interaxial distance is between 19 mm and 38 mm. As discussed below, this base distance is much too small to calculate accurate range or point cloud data. This is important in creating the depth map used to convert 2D to 3D, but also for being able to combine visual effects and CG character animation in native stereo plates. In an example, the use of one or more witness cameras with a stereo production camera rig, but with the witness cameras being spaced apart from the conventional stereo production rig, allows for creating 3D point cloud data that can be used for post-production visual effects and animation and for motion capture. In other words, the cine camera as described herein can, in one example, be a conventional stereo production rig having the aforementioned typical interaxial distance.

The operation of cameras 102 is synchronized via camera electronics 130. In an example, one of the cameras, such as center camera 102C, includes a clock 131 and an electronic interface as part of its camera electronics 130, with the clock and electronic interface being used to synchronize the frames of the cameras. In an example, witness cameras 102 are shutter-phased to cine camera 102C. In examples, global or rolling shutter can be used.

In an example, the point of trigger (exposure) for witness cameras 102 is determined when the shutter of cine camera 102C is at the center of the "effective" shutter open position. Witness cameras 102 preferably shoot with the shortest possible shutter settings to minimize "motion blur," and overall exposure is controlled by varying the stop in lens 120 or by adjusting the system gain via camera electronics 130. The use of time-code slates and the recording of time code as metadata make it possible to synchronize and identify the corresponding cine images captured by cine camera 1020 and the reference images captured by witness cameras 102.

In an example, one or more of cameras 102 are high-resolution color machine-vision cameras. As discussed above, cameras 102 need not be the same, though for cameras having image sensors 126 with different pixel sizes, rectification of the pixel sizes should be performed as part of the post-processing for optimum results.

An example camera 102 is a digital camera suitable for both still and motion pictures. An example camera 102 has a 5K (e.g., 5120 pixels by 2700 pixels) or greater image sensor 126, with lens 120 having 18 stops of dynamic range and a rolling shutter. A suitable witness camera 102 includes the EPIC or SCARLET cameras available from Red Camera Company, Lake Forest, Calif. Such cameras can be used for just the one or more witness cameras 102, just the cine camera 102C, or can be used for both witness and cine cameras so that all of the cameras are the same. It is anticipated that the digital technology for cameras 102 will continue to develop and improve, e.g., will have increasing numbers of pixels, better lenses, more robust camera electronics, etc.

In an example, camera electronics 130 includes wavelet compression to optimize image data storage in removable memory 132. Camera electronics 130 also optionally includes filtering capability for filtering the raw captured image so that a filtered image is stored in removable memory 132. In an example, a removal memory 132 that provides 64 gigabits (Gb) of storage can store about 6 minutes worth of filtered images.

In an example, image sensors 130 of witness cameras 102 are sensitive to near-IR wavelengths (850 nm to 940 nm) so that a potentially dark scene can be illuminated with near infrared light. In this case, cine camera 102C can be protected from viewing the IR illumination through the use of an IR rejection filter, such as the Tiffen IR ND Filter.

In an example, witness cameras 102 are equipped with a variety of matched focal length lenses 120W that match the horizontal view of the cine lenses 120C. In an example, the choice of lens 120W for the witness cameras 102 is determined by the choice of lens for the cine camera 102, subject the criteria that the horizontal field of view witness lens 120W is greater than or equal to the horizontal field of view of the cine lens 120C.

Camera Support Device

Figure 4:
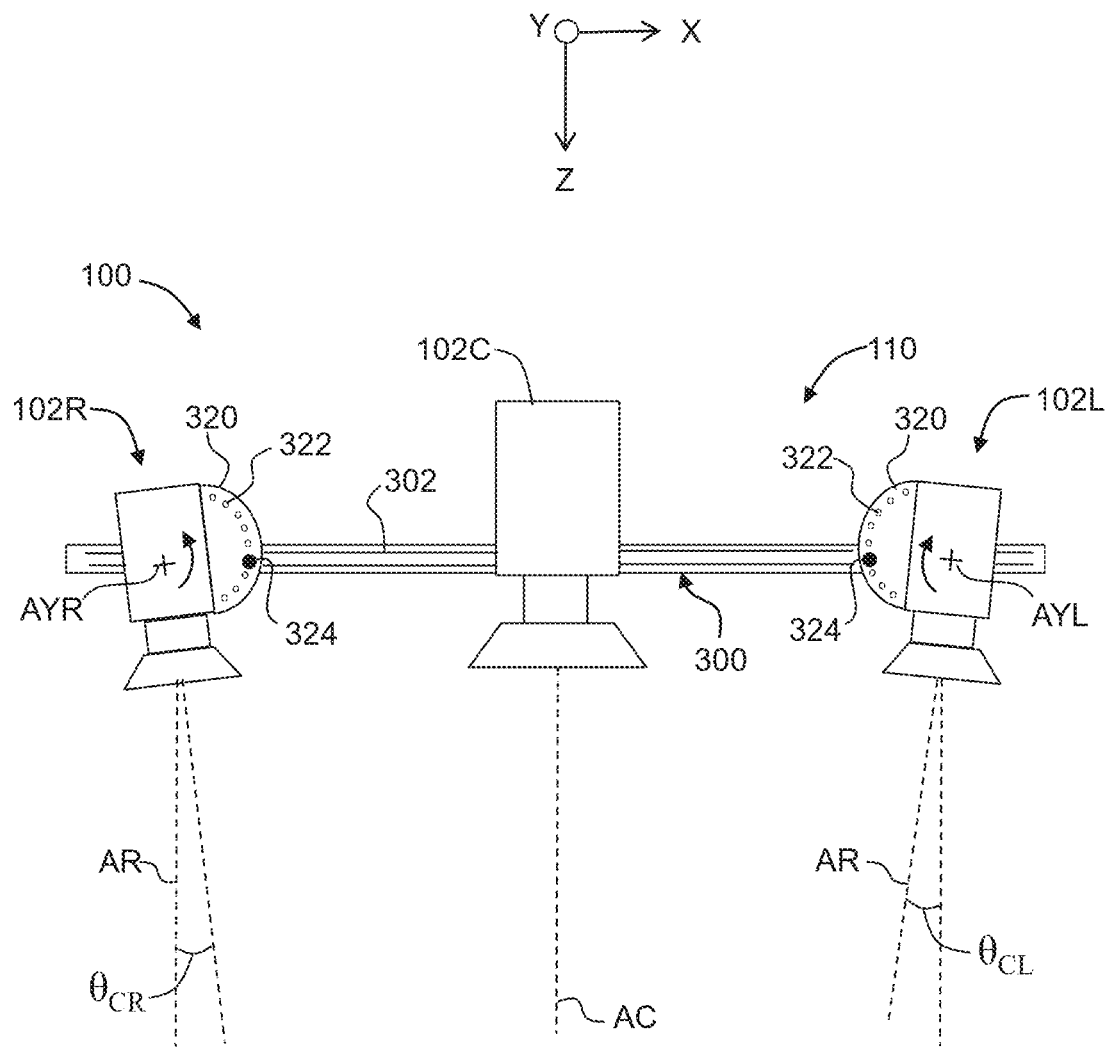
FIG. 4 is a top-down view and FIG. 5A is a front-on view of an example camera support device in the form of a rail system configured to allow the cameras of the camera system to pan horizontally (parallel view) and to have a select convergence angle $\theta_C$.
Figure 5A:
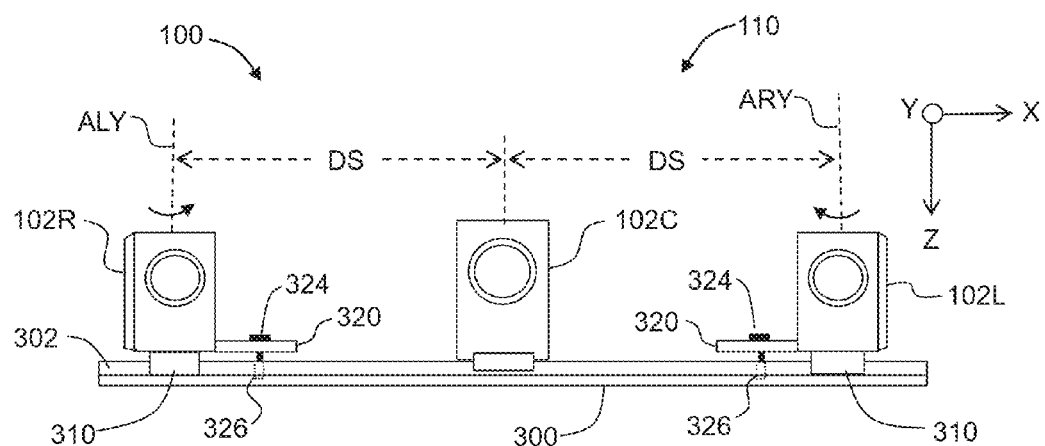

As discussed above, in an example, cameras 102 are operably supported by a camera support device 110. FIG. 4 is a top-down view and FIG. 5A is a front-on view of an example camera support device 110 in the form of a rail system configured to allow cameras 102 to pan horizontally (parallel view), and to have select convergence angles $\theta_C$ (e.g., $\theta_{CL}$ and $\theta_{CL}$ for the three-camera configuration).

An example camera support device 110 includes a rail 300 to which cameras 102 can be mounted. Witness cameras 102 each include a mounting device 310 that allows for the witness cameras to be positioned along rail 300 and fixed thereto at desired positions, i.e., at a select distance DS from cine camera 102C. In an example, rail 300 includes a track 302 sized to accommodate a complimentary groove (not shown) in mounting device 310. Mounting device also is configured to allow for each corresponding witness camera 102 to rotate about its Y-axis, i.e., about axis ALY for left witness camera 102L and about axis ARY for right witness camera 102R.

In an example, camera support device 310 is configured so that the convergence angles $\theta_C$ can be set to within a few arc-seconds of a desired or target convergence angle. In an example, the convergence angles $\theta_C$ can be manually set by the operator depending on the 3D requirements of the scene. In another example, a high-precision rotation motor is used to automatically set the convergence angle.

In an example embodiment, the convergence angle $\theta_C$ for each witness camera 102 is adjustable in small angular increments, e.g., 5 degree increments, using for example a precise mechanical pin registration system for accurate and repeatable setting of the convergence angle. Thus, in the example illustrated in FIG. 4 and FIG. 5, mounting device 310 includes a plate 320 having holes 322 formed therein that locks the mounting device to rail 300 via pins 324 that engage corresponding holes 326 in rail 300, Holes 322 are configured to accurately correspond to select convergence angles $\theta_C$. In an example, holes 326 are also formed at precise distances from cine camera 102C. The length L of rail 300 can be any practical length, with 1 meter to 6 meters being an exemplary range of lengths. In an example embodiment, rail 300 is telescopic so that length L can be adjusted.

In an example embodiment, rail 300 is configured to that it experiences minimum bending, flexing and vibration under operating conditions, with the result that the relative positions and orientations (convergence angles) of cameras 102 are precisely maintained at all times with substantially no relative movement or vibration during the operation of 3D system 10. Rail 300 is preferably made of one or more light-weight materials, with aluminum and carbon fiber being two exemplary materials. One skilled in the art will appreciated that various mounting configurations for cameras 102 are possible and that the example configurations described herein are provided by way of example.

Figure 5B:
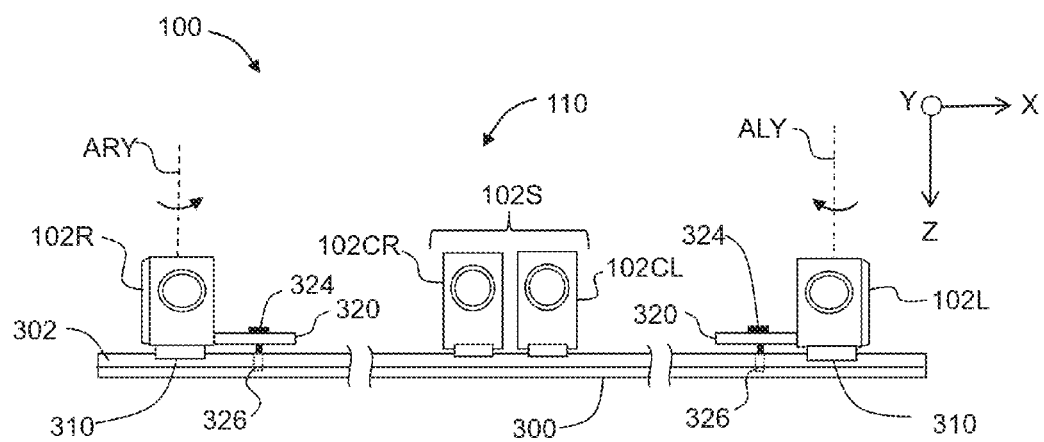
FIG. 5B is similar to FIG. 5A and illustrates an example embodiment that includes two cine cameras configured as a stereo rig to capture conventional 3D stereo images of a scene.

FIG. 5B is similar to FIG. 5A and illustrates an example embodiment where 3D system includes two witness cameras 102L and 102R, and two cine cameras 102a and 102CR configured as a stereo camera rig 102S. This configuration allows for the stereo camera rig 102S to obtain conventional 3D stereo images while the witness cameras 102L and 102R capture the spatial data for the scene necessary for forming the point cloud or polygonal mesh and providing robust 3D stereo post-processing. The stereo rig 102S may also include a beam-splitter arrangement that allows for the two cinematography images to be captured at positions separated by the interocular distance of about 68 mm.

Figure 6:
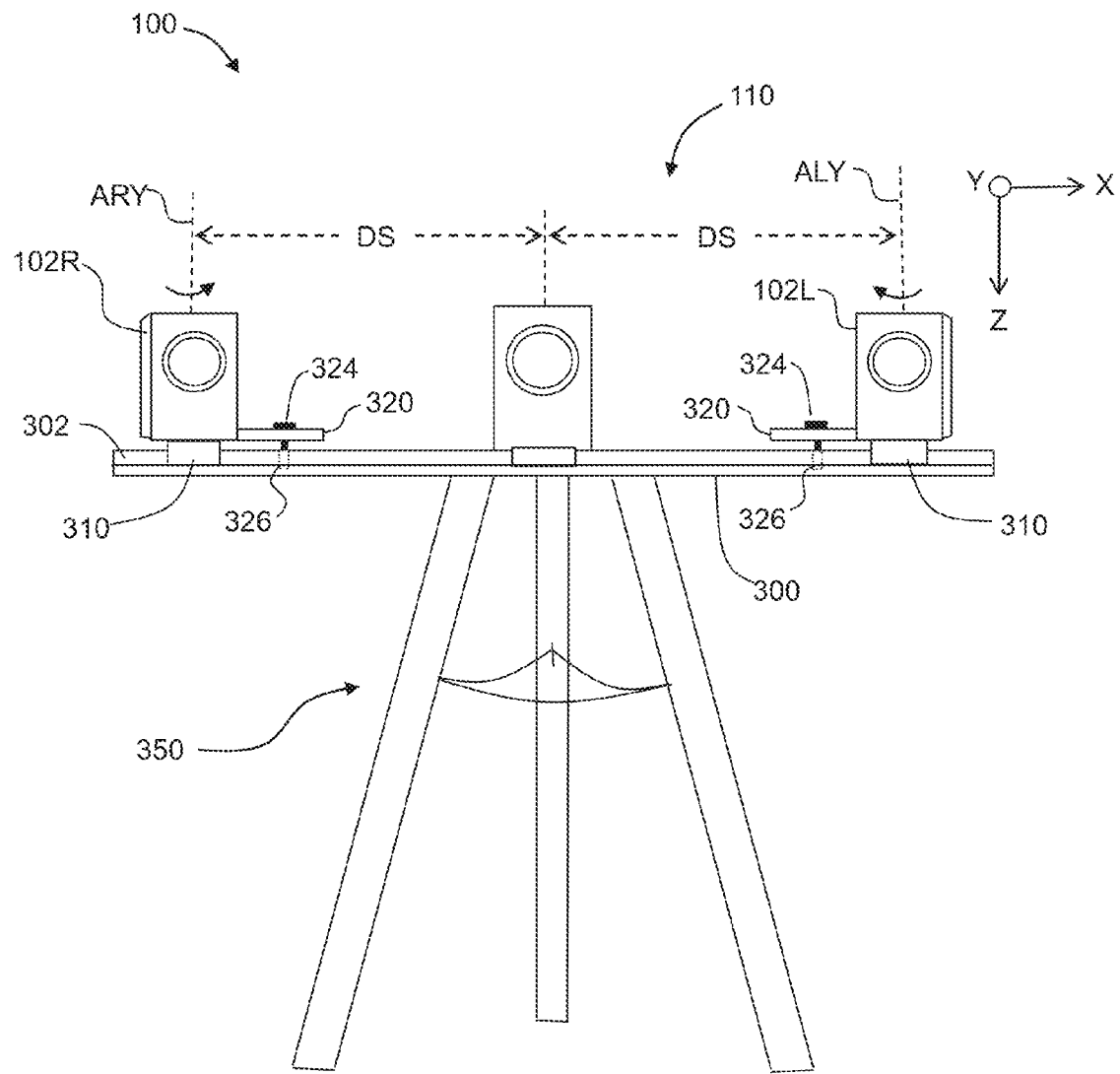
FIG. 6 is a front-on view that illustrates an example camera mounting device that supports the camera support device of FIG. 4 and FIG. 5.

FIG. 6 illustrates an example configuration where camera mounting device 310 includes a base support 350, such as a tripod stand or like base support structure. Note, however, that cameras 102 need not be supported by a common camera mounting device 310. Thus, with reference to FIG. 7, an example embodiment of camera system 100 has each camera 102 supported by its own base support so that camera support device 110 is not needed. This configuration is workable as long as the relative positions and orientations of cameras 102 are accurately known. The relative positions and orientation of cameras 102 can be established, for example, using laser-based position and alignment devices 352, which can be interfaced with camera electronics 130. Laser beams 353 associated with laser-based position and alignment devices 352 are shown as dotted lines in FIG. 7. Wireless communication can also be used between the camera electronics 130, as illustrated by wireless signals 131.

Figure 7A:
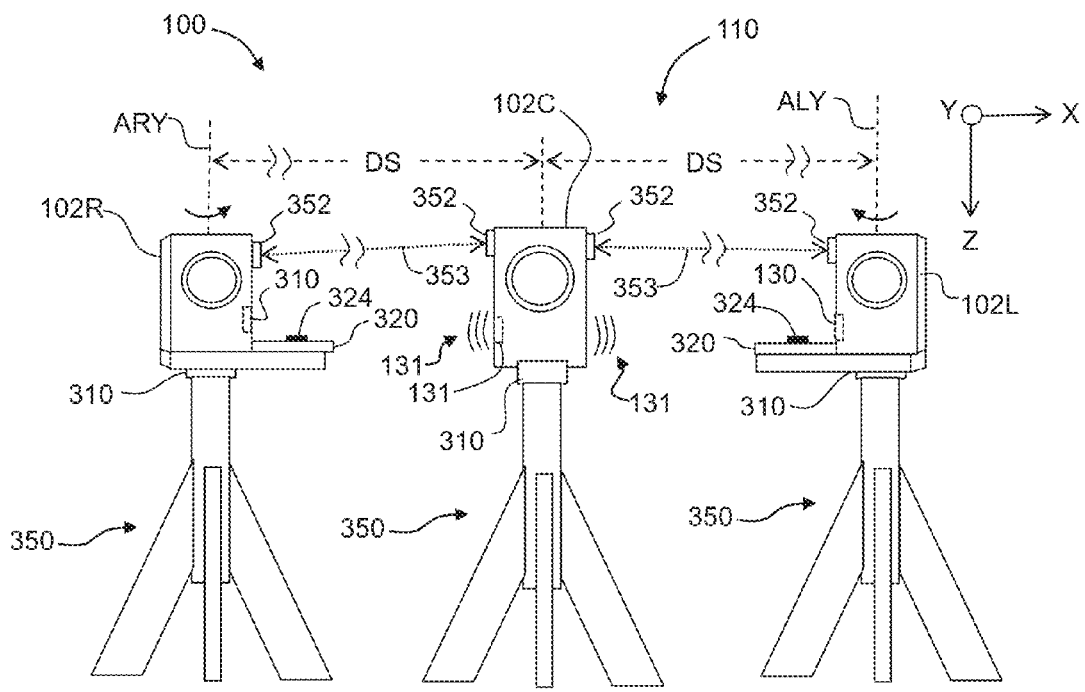
FIG. 7A is similar to FIG. 6 except illustrating an example where the camera mounting device includes separate mounts for each camera.
Figure 7B:
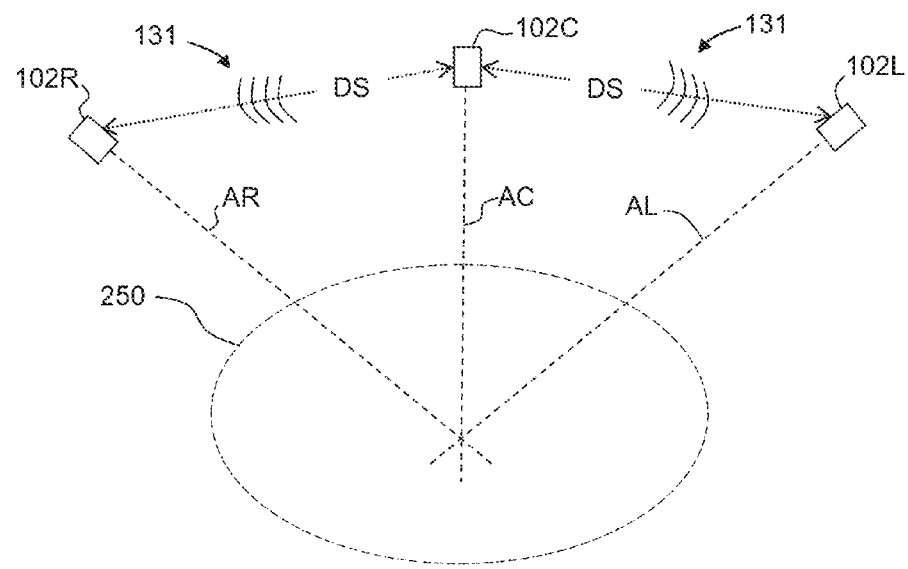
FIG. 7B is a plan view of the camera layout of FIG. 7A, better illustrating that the cameras can be spaced relatively far apart from one another relative to conventional stereo imaging that employs two cinematography cameras on a stereo camera rig.

In FIG. 7A, the cameras can be quite far apart, as better illustrated in the plan view of FIG. 7B.

The configuration of 3D system 10 of FIGS. 7A and 7B supports an embodiment where cine camera 102C is "free-roaming," meaning that it can be positioned independently of the witness cameras 102L and 102R. This allows for generating point cloud data (discussed in greater detail below) for a completely separate 2D or 3D cine camera. This point cloud can be referenced back to the free roaming cine camera and used by visual effects to accurately position additional CG characters and environments into complex 3D stereo scenes. Cameras 102 would be in wireless communication to sync up all camera shutters. Post-processing as described in detail below is then used to connect the cine camera view to the point cloud data, which is taken from a different perspective.

In an example, cameras 102 can be in wireless communication to sync up all camera shutters. Post-processing, as described in detail below, is then used to connect the cine camera view to the point cloud data, which is taken from a different perspective. Since the witness Cameras 102L and 102R are shutter-phased with the production 3D stereo cameras, the creation of volumetric point cloud data (which is created on a frame-by-frame basis) is like having a 3D scan of the scene (e.g., the set and actors therein) per frame. This animating point cloud not only records accurately the 3-space of fixed architecture, but also records the movement and position of actors and objects in motion within the scene.

The production 3D stereo cameras are than virtually tracked and locked to this point cloud on a per frame basis using a 3D computer software package, such as MAYA® point-cloud software, available from Autodesk, San Rafael, Calif. The six axes of tracked translations of the camera are then key-framed into a virtual facsimile of the production 3D camera rig, with the view of these virtual cameras locked to the animated point cloud.

This animated point cloud is extremely helpful to the animation "Layout Department," which is involved in adding additional CG elements to the live action stereo plates, such as CG characters and enhancing the live action environment with additional CG sets and architecture. The point cloud gives precise 3D positions of all objects in the scene, thus allowing the CG additions to be made to the live action stereo plate in an efficient and accurate manner.

The motion capture of live (e.g., human or animal) actors to be combined digitally with backgrounds shot with either 2D or 3D stereo cameras presents a significant challenge when attempting to align the motion capture volume to the photographed plate. Since true spatial data of the photographed scene is not embedded within the initial photography, other techniques must be used to properly align the actors' position and their actions within the motion capture volume.

The animated point cloud is a robust solution because each point in the point cloud can be loaded virtually into the 3D volume of the motion capture stage. This point cloud allows the operators and actors to reference their position and timings to the animated point cloud, thereby recreating the original objects in the photographed scene. The virtual production camera with its key-framed positional translations can also be imported into the motion capture volume. This virtual camera allows the motion capture operators to view the motion capture actors through the same effective virtual lens as what was used to shoot the original live action background.

An additional use of the point cloud in a motion capture volume is to convert this point cloud into a "bird's eye" view from the top to be projected in scale on the floor of the motion capture volume. An orthographic view from above of the point cloud can be graphically simplified into basic animated artwork that represents critical objects or timings of objects in a scene that actors must accurately interact with. This simplified graphic representation of the point cloud can be projected with a video projector onto the floor of the motion capture volume. This graphic representation of the point cloud data can perform as an interactive guide for the motion capture actors to help position their actions for both position and timings to photographed elements critical to the scene.

Figure 8:
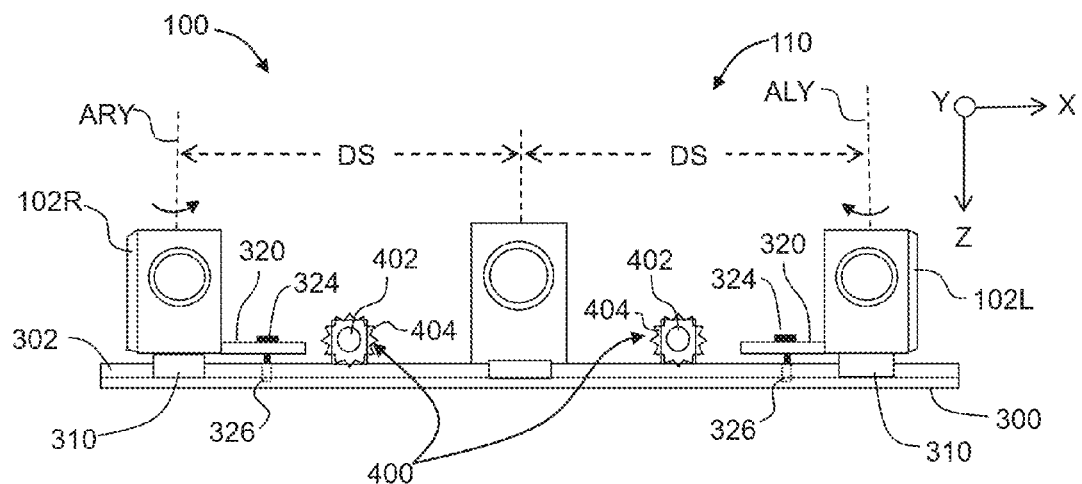
FIG. 8 is a front-on view of the camera system and illustrates an example embodiment where the camera system includes an illumination system configured to illuminate objects in the scene.

FIG. 8 illustrates an example embodiment where camera system 100 includes an illumination system 400. In an example, illumination system 400 includes one or more light sources 402 that in one example emit light 404 in the near IR wavelength range of 850 nm to 940 nm. Examples of IR light source 402 include light-emitting diodes (LEDs), laser diodes or near-IR lasers. In an example, illumination system 400 is configured to illuminate the scene in volume 250 when production lighting is less than optimal. In an example, IR illumination system 400 is configured so that the amount of illumination 404 from light sources 402 can be controlled. In an example, light source 402 emit IR light 404 and the amount of IR light level is balanced with the production lighting (which is typically white light) used for the particular scene.

In an example, illumination system 400 is configured to generate "textured light" 404 that includes a spatial intensity variation that result in a light pattern when an object 240 in scene 242 is illuminated. Textured light 404 is used to highlight objects 240 that might otherwise lack sufficient texture to be able to determine the objects range and the range of features within the object.

Figure 9:
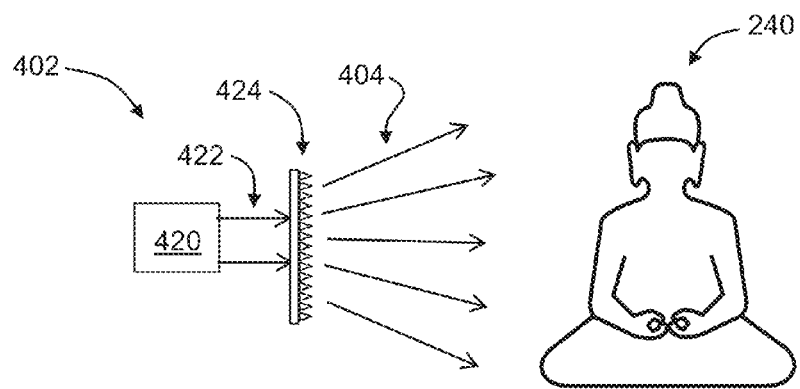
FIG. 9 is a schematic diagram of an example camera system light source that generates textured light and includes a laser and a diffraction grating to generated multiple diffracted light beams.

FIG. 9 illustrates an example light source 402 that generates textured light 404. Light source 402 of FIG. 9 includes a laser 420 and a diffraction grating 424 arranged to receive light 422 from the laser and diffract light 422 to form textured light 404 comprising multiple diffracted light beams. In an example, laser 420 operates in the near IR so that textured light 404 is visible to witness cameras 102 but is made invisible to the cine camera 102C using a IR-rejection filter. In another example, laser 420 operates in a narrow band of visible light, e.g., 589 nm (yellow-orange), which is visible to witness cameras 102 but is blocked from being detected by the cine camera using a correspond narrow-band rejection filter (e.g., a Didymium-coated filter). Such narrow-band filtering in the visible does not substantially affect the ability of cine camera 102C to record live-action color 2D image.

In an example, lasers 420 are pulsed (e.g., strobed) in synchronization with the shuttering of the witness camera shutters and cine camera shutters. The laser pulse duration is preferably kept as short as possible to reduce any distracting effects to the case and crew involved with imaging scene 240. In an example, light sources 402 are synchronized with the same camera electronics 130 that control the operation of the cine camera 102C and witness cameras 102.

Measuring Camera Parameters for Camera Calibration

It is anticipated that many 3D stereo imaging applications that use 3D system 10 will require high-quality imaging. Because the post-processing methods described in detail below involve comparing high-resolution images from different cameras, small differences in the imaging quality of lenses 120 and image sensors 130 can result in errors when the pre-processed images are combined. For example, differences in distortion between cameras can lead to difficulties in correlating pixel positions of the different cameras for a given object in the scene because the distortion will cause an unintended shift in pixel positions for different cameras imaging the same object from different directions. Thus, knowing the camera distortions allows for correcting the captured images prior to attempting camera pixel correlations and performing post-processing the viewable images.

Accordingly, an aspect of the disclosure includes measuring one or more camera parameters for cameras 102 and performing a camera calibration so that differences between cameras that could impact the post-processing of viewable images is reduced and preferably substantially eliminated. Example camera parameters include lens distortion, sensor position, principal point and nodal point locations, and F-stop vs. focal length variations.

In example, at least some of the camera parameters can be obtained from the camera manufacturer for the given lenses. The difference in camera parameters between cameras 102 can be reduced or eliminated during the post-processing steps since the viewable images from the different cameras are still available for processing, and the measured camera parameters directly relate to the captured viewable images for the particular camera.

Camera Set Up

Once the above-mentioned parameters for cameras 102 are measured, the cameras need to be arranged on camera support device 110 so that the relative camera orientations are well defined. Thus, in an example camera registration is performed wherein each camera 102 is mounted on the camera support device and then the camera spatial coordinates (x, y, z) and the corresponding camera angular coordinates ($\omega$, $\phi$, k) (i.e., rotation angles about x, y and z, respectively) are established for each camera relative to a reference ("world") coordinate system.

Figure 10:
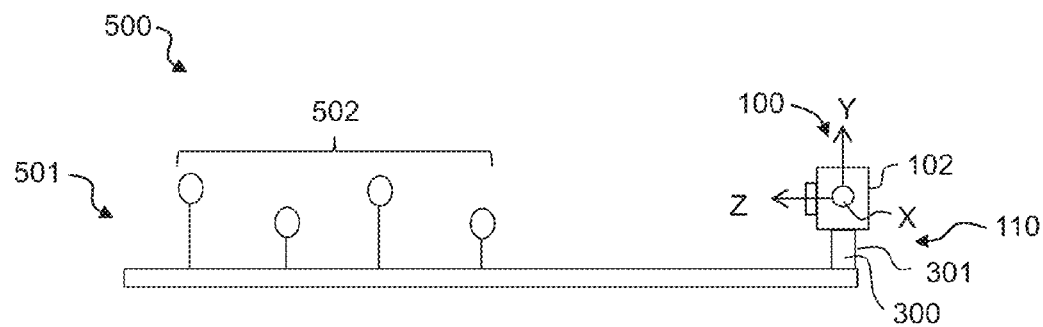
FIG. 10 is a schematic diagram of an example camera registration system.

FIG. 10 is a schematic diagram of an example camera registration system 500. Camera registration system includes camera system 100 with cameras 102 mounted on camera support device 110. A jig 301 that includes reference objects 502 is arranged relative to camera system 100. Reference objects 502 have select heights, sizes and positions. Test images are captured by each camera 102 and the camera orientation established relative to a reference coordinate system, which is shown based at left witness camera 102 by way of example. Camera parameters such as distortion can also be measured using jig 500.

Figure 11A:
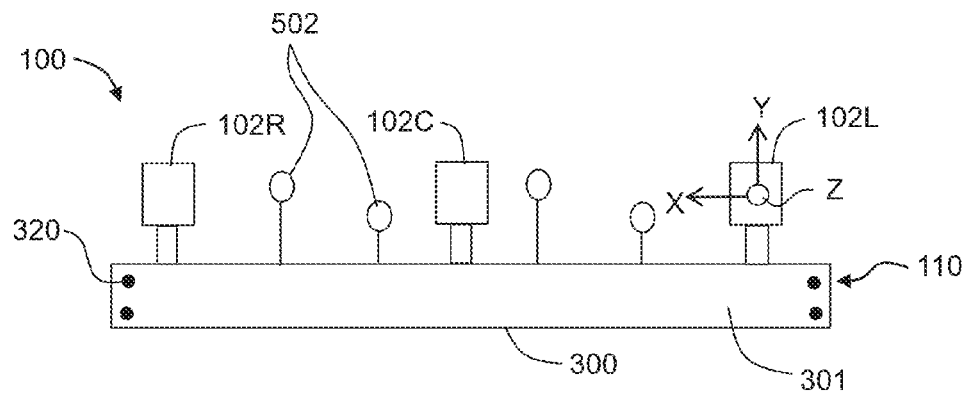
FIG. 11A is a rear-end view of the camera registration system of FIG. 10 showing registration indicia on the back surface of the camera support device that allows for a registration camera to capture the registration information for the cameras in the camera system.
Figure 11B:
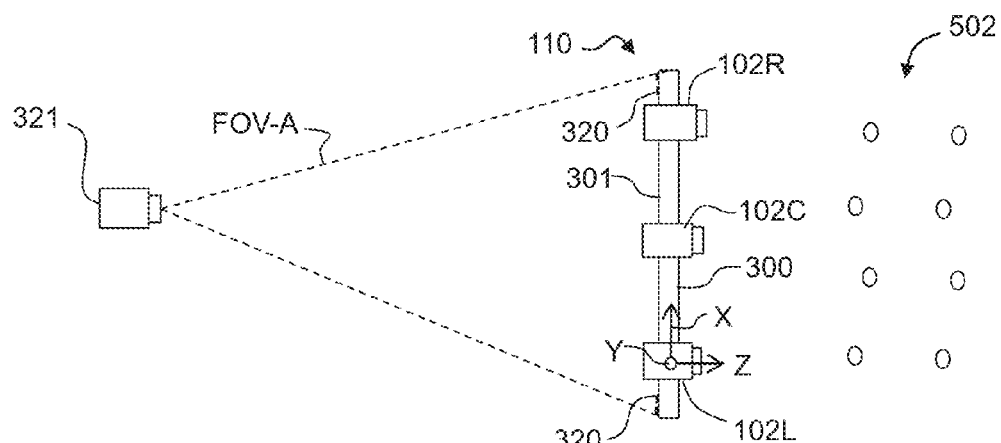
FIG. 11B is a top-down view of the camera registration system of FIG. 10 showing how the registration camera captures an image of the camera support device to capture the camera system registration information.

FIG. 11A is a rear-end view of the camera registration system of FIG. 10 showing registration indicia 320 on the back surface 301 of camera support device 110. FIG. 11B is a top-down view of the camera registration system of FIG. 11A and shows how a registration camera 321 with a field of view FOV-A captures an image of camera support device 110 to collect camera registration information.

Post-Processing of Viewable Image Data

Figure 12:
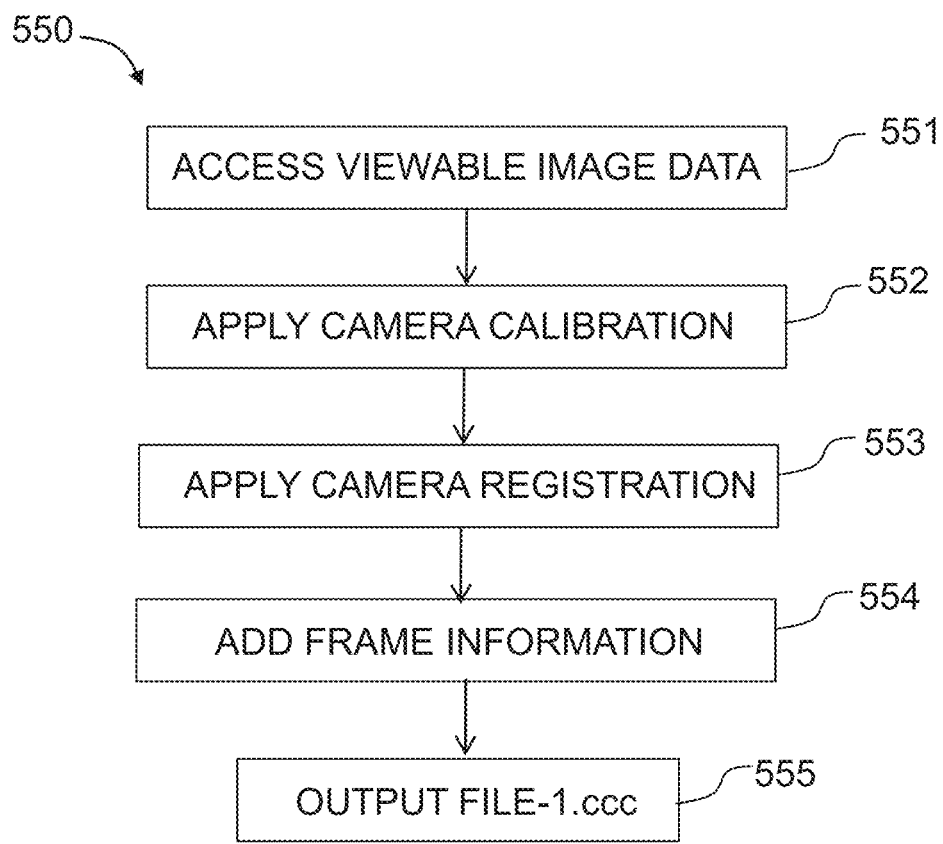
FIG. 12 shows a flow diagram that sets forth an example of an initial post-processing method for creating corrected viewable image data.

FIG. 12 shows a flow diagram 550 that sets forth an example of an initial post-processing method for creating corrected viewable image data. The method comprises a number of steps 551 through 555.

Thus in step 551, the viewable image data is accessed, and in step 552 the camera calibration (based on the measured camera parameters) is applied to the viewable image data to reduce or eliminate differences in the viewable images due to differences between cameras 102.

Next in step 553, the camera registration is applied to the camera-calibrated viewable image data formed in step 552 to reduce or eliminate camera registration errors between cameras 102.

Step 554 is an optional step of adding information (e.g., notes, comments, etc.) to the various image frames.

The result of the above steps forms in (step) 555 a first output file denoted FILE-1.ccc that includes corrected viewable image data. The corrected viewable image data is in the form of frames F for each of the witness cameras 102 (e.g., frames $F_{WD}$ and $F_{WR}$ for the left and right witness cameras 102L and 102R) and the cine camera 102C (e.g., frames $F_C$).

The corrected viewable image data for each frame F is 2D in spatial coordinates and also includes R-G-B color information, i.e., F(x, y; RGB), with x and y corresponding to the pixel spatial coordinates of the corresponding image sensor 130. The various frames F can be stored in a first output file FILE1, which in an example is in "curtain call native bitmap graphic format," i.e., FILE-1.ccc.

Figure 13A:
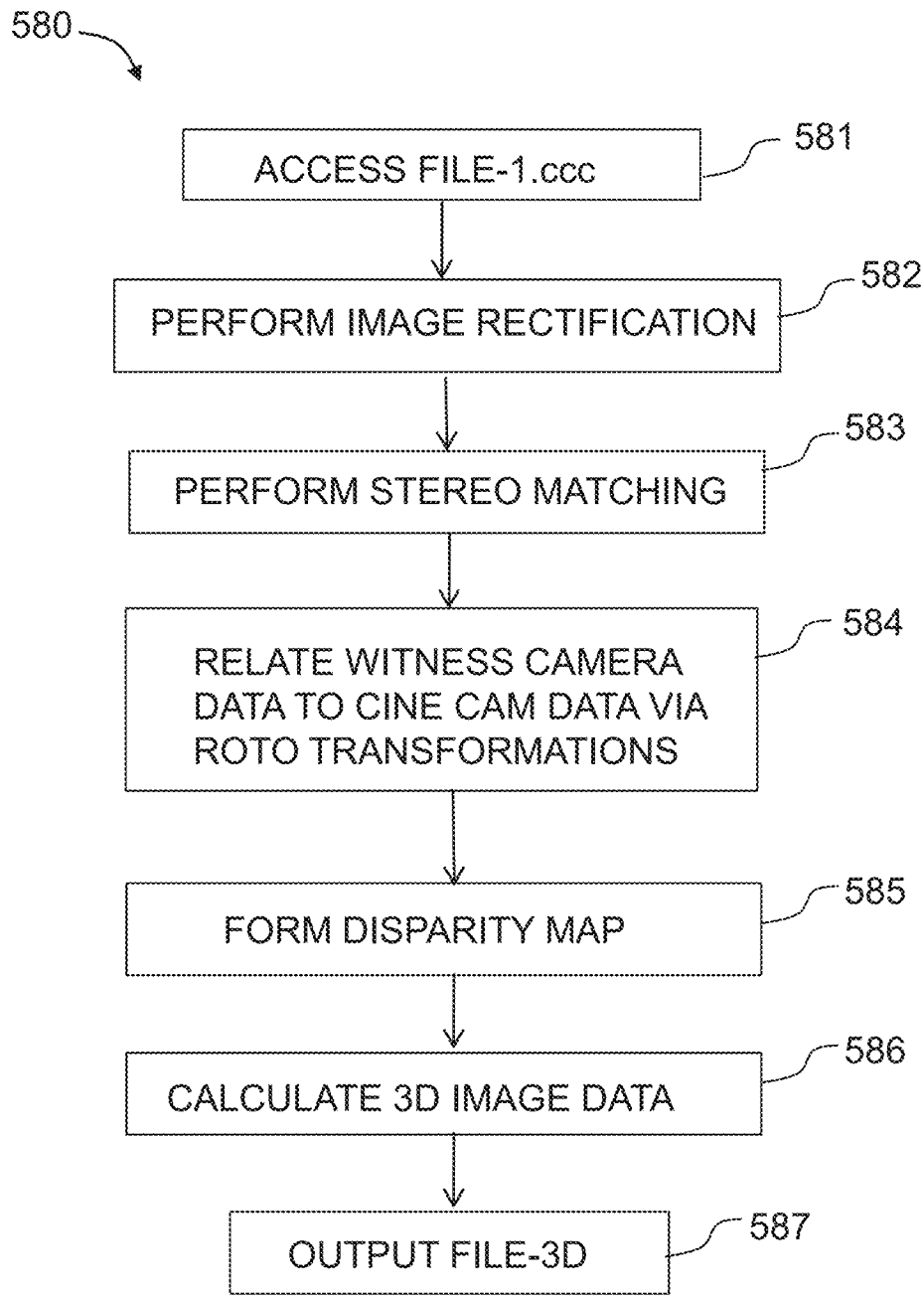
FIG. 13A shows a flow diagram that sets forth an example post-processing method for converting the 2D corrected viewable image data formed by carrying the steps of the flow diagram of FIG. 11 into 3D stereo image data.

FIG. 13A shows a flow diagram 580 that sets forth an example post-processing method (with steps 581 through 585) for converting the 2D corrected viewable image data in first output FILE-1.ccc into 3D stereo image data. With reference to flow diagram 580, in step 581, the first output file FILE-1.ccc is accessed and in step 582 image rectification is performed. Image rectification involves ensuring that each of the images for each frame F has substantially the same format. For example, if cameras 102 reside in different planes, the images (frames) will be skewed relative to one another. The process of image rectification seeks to remove this skew, or at least reduce it so that it is insubstantial. Also, slight magnification differences between the cameras can result in differences in the size of the images.

Thus, the image rectification process ensures that the image sizes are the same to within sub-pixel resolution. Similarly, differences in the images caused by slight differences in the fields of view of the cameras 102 can be reduced or eliminated during the image rectification process. Thus, image rectification is directed to reducing or eliminating one or more differences in the captured images so that all of the images have substantially the same fundamental format (shape, size, etc.). An example image rectification process is provided in the flow diagram 582 of FIG. 13B, discussed in greater detail below.

Next in step 583, stereo matching is performed on the image-rectified, corrected viewable image data formed in 582. Stereo matching involves correlating the pixel information between the various images, e.g., matching the left witness camera frames $F_{WL}(x_L, y_L; RGB)$, the right witness camera frames $F_{WR}(x_R, y_R; RGB)$ and the cine camera frames $F_C(x_C, y_C; RGB)$ so that the pixels for the different frames are correlated. This means, for example, that an object 240 in scene 242 (see FIG. 3) represented by one set of pixels in the left witness camera frames $F_{WL}$ can now be correlated to a corresponding set of pixels in the cine camera frames FC and the right witness camera frames $F_{WR}$.

Next in step 584, the witness camera viewable image data is related to the cine camera viewable image data from 583. This is accomplished using a processed called "roto."

Figure 14B:
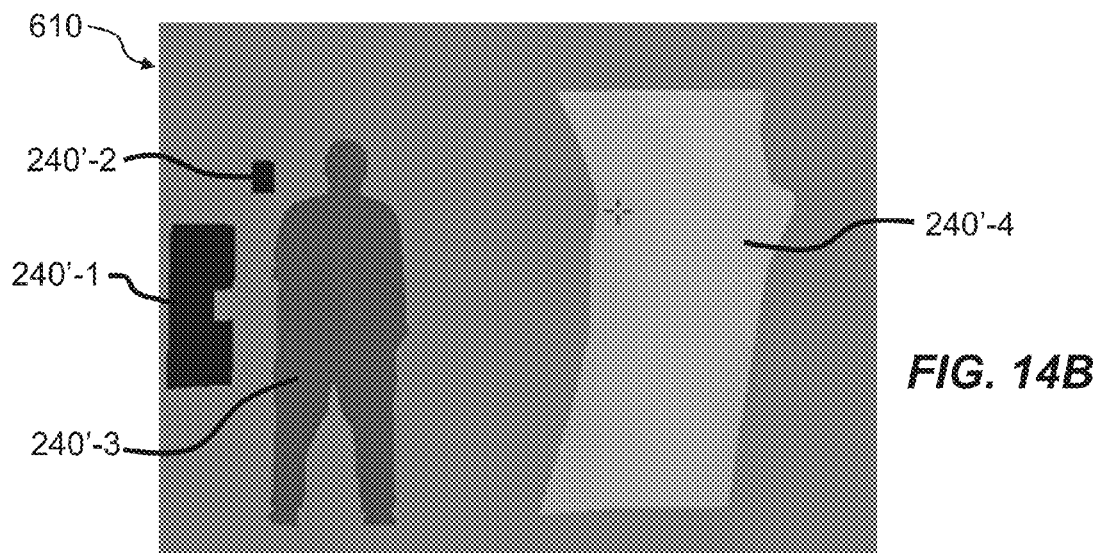
FIG. 14B is an example disparity map for the 2D image of FIG. 14A, illustrating distance information relative to the camera in the form of a corresponding gray scale, with lighter gray scale being associated with closer distances and darker gray scale being associated with farther distances.
Figure 14A:
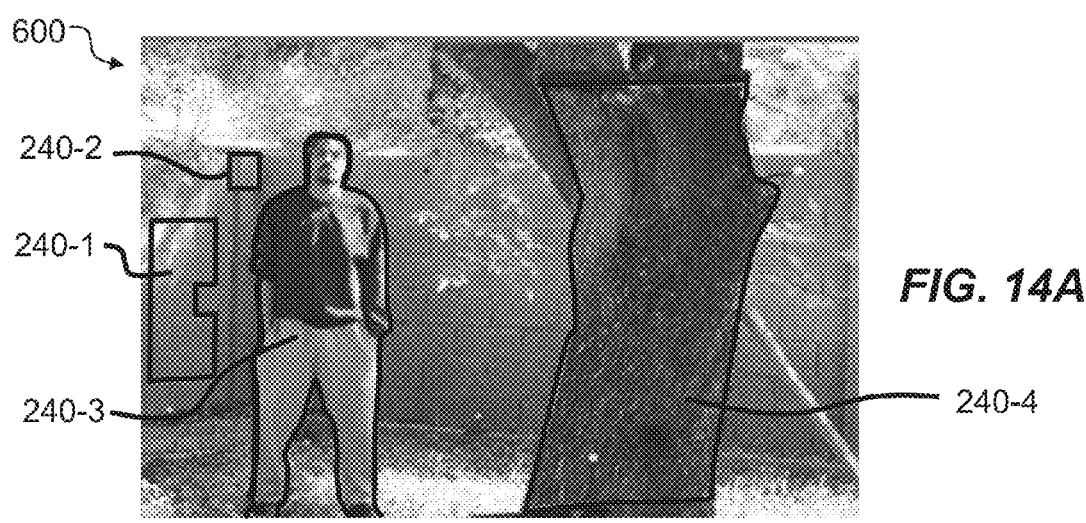
FIG. 14A is an example black and white 2D image that includes a scene with a objects in the form of a tree, a person and wall sections that reside at a variety of distances from the camera.

With reference to FIG. 14A, the roto process involves defining and carving out one or more select portions of the viewable image referred to as "regions of interest," or ROIs. FIG. 14A is an example 2D black and white image 600 from cine camera 102C. 2D image 600 includes objects 240-1 and 240-2 (portions of a brick wall in the background), object 240-3 (a person) and object 240-4 (a portion of a tree in the foreground). Each of these objects has been rotoed (i.e., selected as an ROI), as indicated by the dark-line outline of each of these objects.

Only the selected ROIs of the viewable images are processed while the remaining portions of the viewable images are treated as background. The roto process can be done manually for an initial frame and then carried through automatically for multiple frames.

Thus, the process associated with step 584 includes performing a roto on the cine camera viewable images to define select ROIs to create a rotoed cine camera viewable image RC. This rotoed viewable image RC is then transformed to the left witness camera 102L to form a left witness camera rotoed image RL. This rotoed image is then transformed to the right witness camera to form a left witness camera rotoed image RR. This process results in three rotoed viewable images RL, RC and RR having corresponding or matched ROIs, where the rotoed portions (ROIs) match even though the viewing angles for cameras 102L, 102C and 102R were different. It is noted here that one could start with the image of the left witness camera and roto this image to obtain rotoed left image RL, and then transform this image to the cine camera and right witness camera to obtain the three rotoed viewable images RL, RC and RR.

Next in step 585, the rotoed viewable images formed in step 584 are used to create a "disparity map" 600 that associates gray-scale pixel intensities in the rotoed viewable images with distance (z) from the cine camera 102C. FIG. 14B is the corresponding disparity map 610 to 2D image 600 of FIG. 14A and shows in gray scale the corresponding objects, which are identified in the disparity map as 240'-1 through 240'-4. The remaining portion of the disparity map has a uniform gray background. The gray scale is such that the lighter the color, the closer the object is to camera 120C. Thus, the tree object 240-4 is in the foreground, the wall objects 240-1 and 240-2 are in the background, and the person object 240-3 is at an intermediate distance between the wall object and the tree object.

Disparity map 610 generally provides range data for the rotoed viewable images and comprises one or more frames $F_D(x, y, z) = F_D(x, y; \text{gray scale})$ (FIG. 14B can thus be thought of as an example disparity map frame). The disparity map is formed from the rotoed images (ROIs) in one example by comparing the difference ($\Delta x$, $\Delta y$) for each pixel in left witness camera frames $F_{WL}$ and the right witness camera frames $F_{WR}$ and associating the difference with a distance z. The gray-scale intensities in the image are correlated to distance z, with objects closer to the camera having a lighter gray-scale level than objects farther away, as illustrated in FIG. 14B. In an example, disparity map 610 can have a very large gray-scale dynamic range, e.g., 0 to 65,000. This allows for the disparity map to include a tremendous amount of distance information for the various objects (including portions of objects) in the scene for a given frame.

In an example embodiment, the gray scale for two or more disparity map frames is normalized so that a sequence of frames has a common reference for distance information, i.e., a certain gray scale represents the same distance in one frame as it does in another frame. This is particularly useful when the gray scale can have a large dynamic range such as the aforementioned 0 to 65,000 range.

Figure 14C:
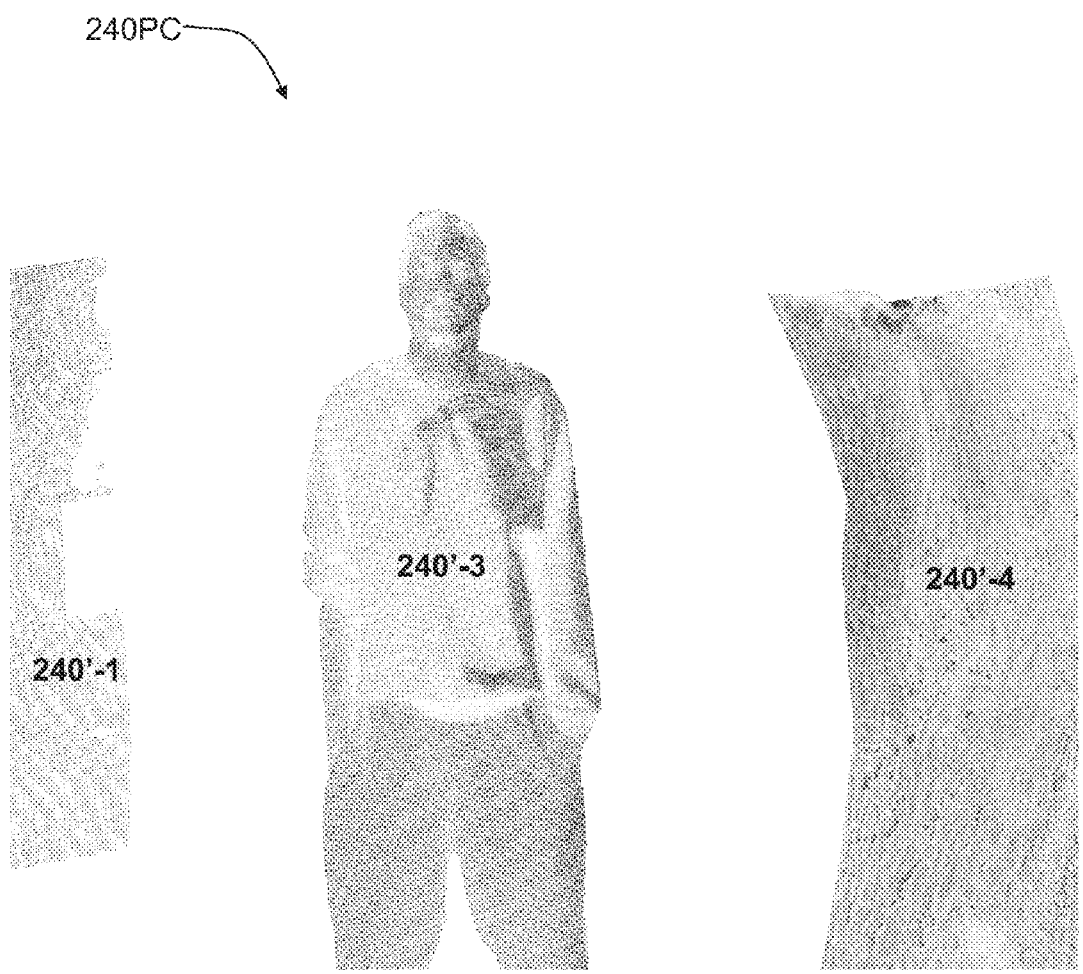
FIG. 14C is an example point cloud formed from the disparity map of FIG. 14B.
Figure 14D:
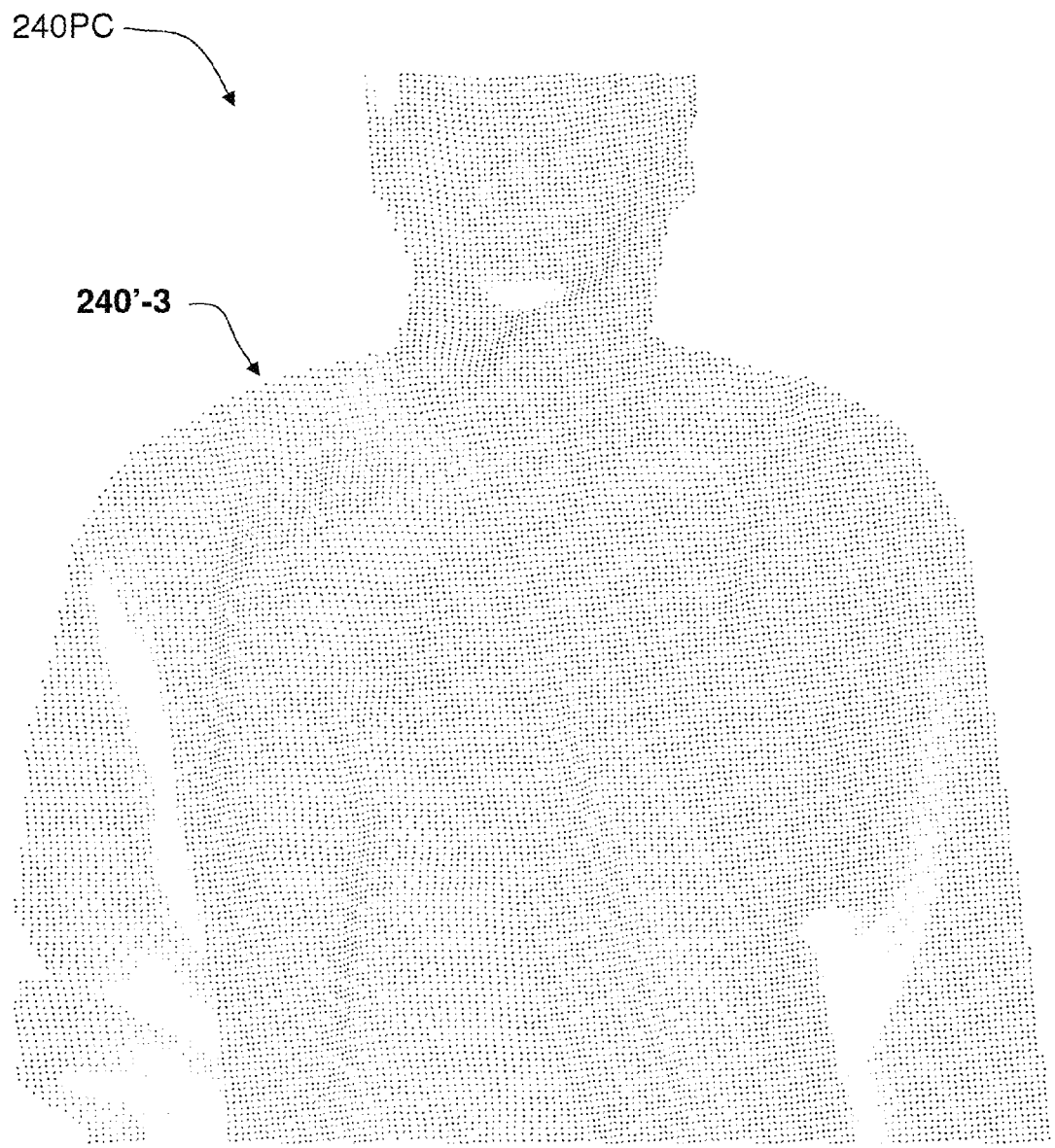
FIG. 14D is a close-up view of the point cloud of FIG. 14C showing more detail of the man in the point cloud.

FIG. 14C is an example point cloud formed from the disparity map of FIG. 14B. FIG. 14D is a close-up view of the point cloud of FIG. 14C showing more detail of the man 240'-3 in the point cloud.

Figure 15A:
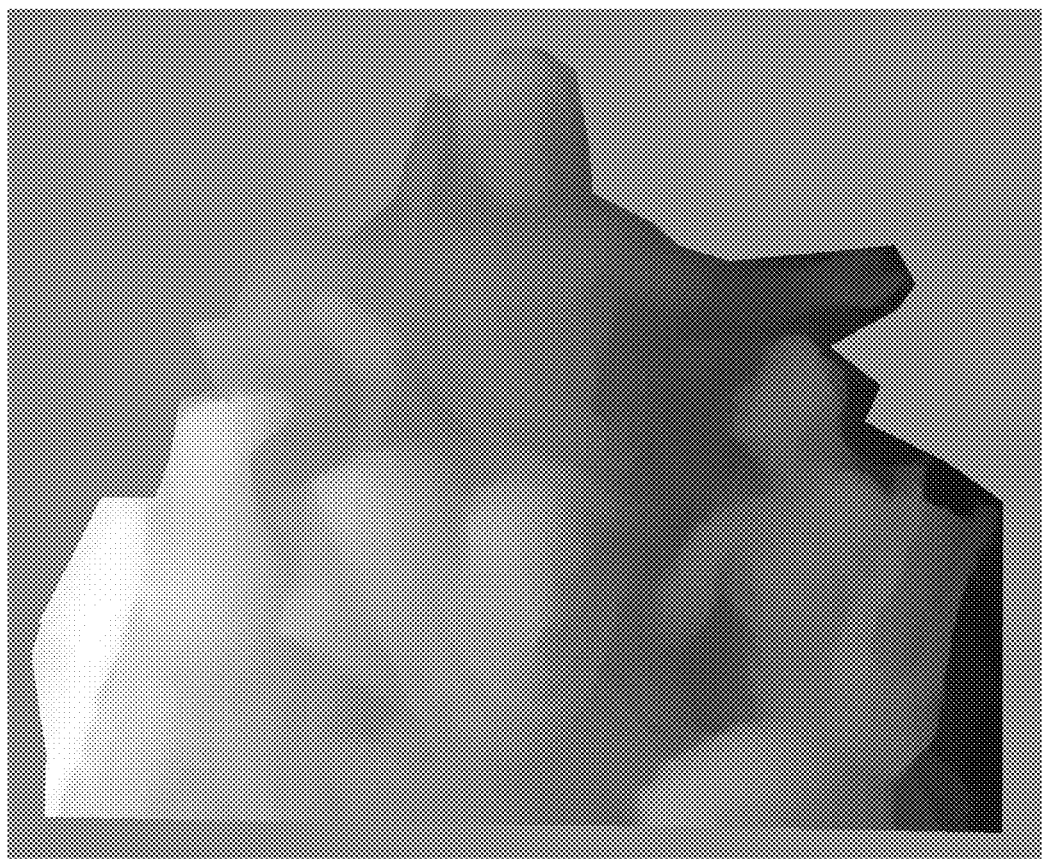
FIG. 15A depict an example disparity map for an object in the form of a bas relief sculpture.

FIG. 15A depicts an example disparity map 240DM for an object in the form of a bas relief sculpture.

With reference again to flow diagram 580 of FIG. 13A, next in step 586 3D image data is calculated, whereby the 2D images from cine camera 102C are embedded with the range data at sub-pixel accuracy, creating a voxel-based image. The 3D image data can be expressed as a "point cloud" P(x, y, z), where each element in the point cloud is a "pixol" representing a point in 3D space. The point cloud P is typically comprised of thousands of points.

Figure 15B:
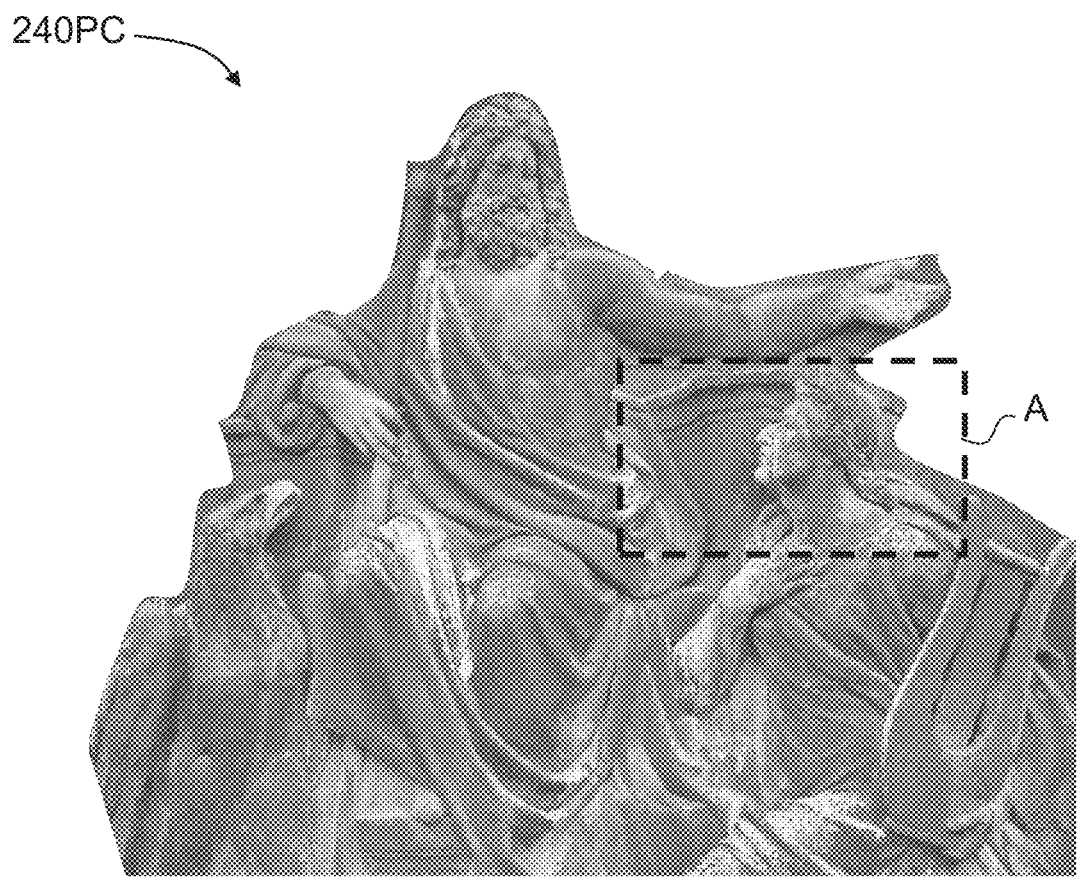
FIG. 15B depicts example the point cloud data based for the bas relief sculpture on the disparity map of FIG. 15A.
Figure 16:
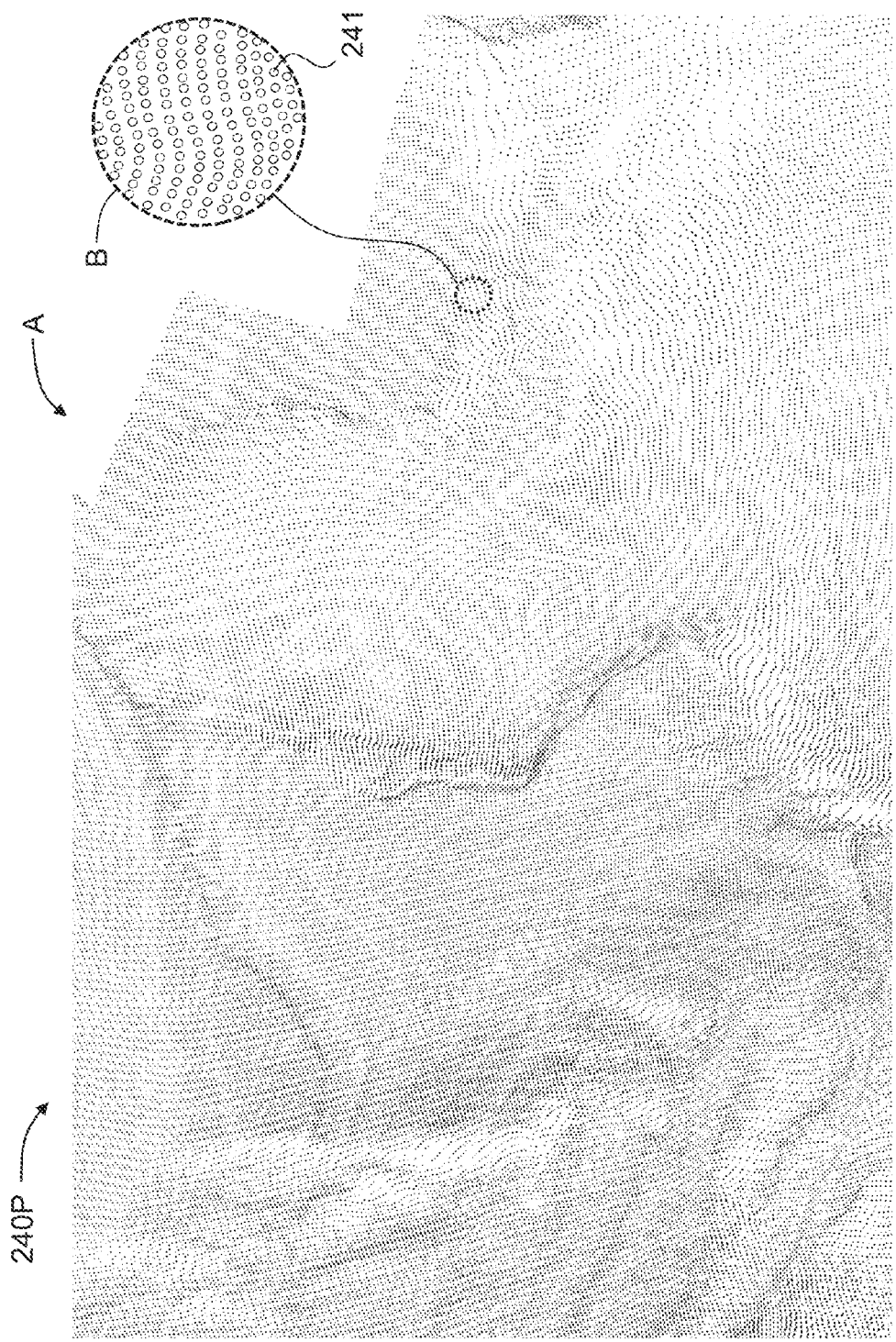
FIG. 16 shows details of the region A identified in FIG. 15B and shows how the point cloud is formed by points, with region B showing a close-up portion of region A that schematically illustrates the points making up the point cloud.

An example point cloud 240PC formed from the bas relief sculpture disparity map 240DM of FIG. 15A is shown in FIG. 15B. A region A of point cloud 240P is denoted by a dashed-line rectangle. FIG. 16 is a close-up view of region A that shows point cloud 240P being comprised of thousands of points 241 in the point cloud. A close-up inset B shows a magnified small region of region A that more clearly shows points 241. Note that point cloud 240P looks remarkably like an actual image or picture.

The 3D image data can also be expressed as a polygonal mesh PM(x, y, z; RGB), wherein each element in the mesh is a "voxol" defined by three spatial coordinates and corresponding RGB values.

In an example, the 3D image data is calculated from the disparity map using triangulation techniques known in the art of photogrammetry (i.e., photogrammetric triangulation). This process solves the position of the six camera parameters (i.e., spatial coordinates (x, y, z) and angular coordinates ($\omega$, $\phi$, k) using the calibrated camera coefficients to compute the 3D coordinates. This process is described in greater detail below in connection with the image rectification process.

In step 587, the 3D image data is outputted to a file, e.g., FILE-3D, which can be in one of the commonly used graphics formats such as ASCII. FILE-3D includes either the point cloud data or the polygonal mesh data.

Image Rectification

Figure 13B:
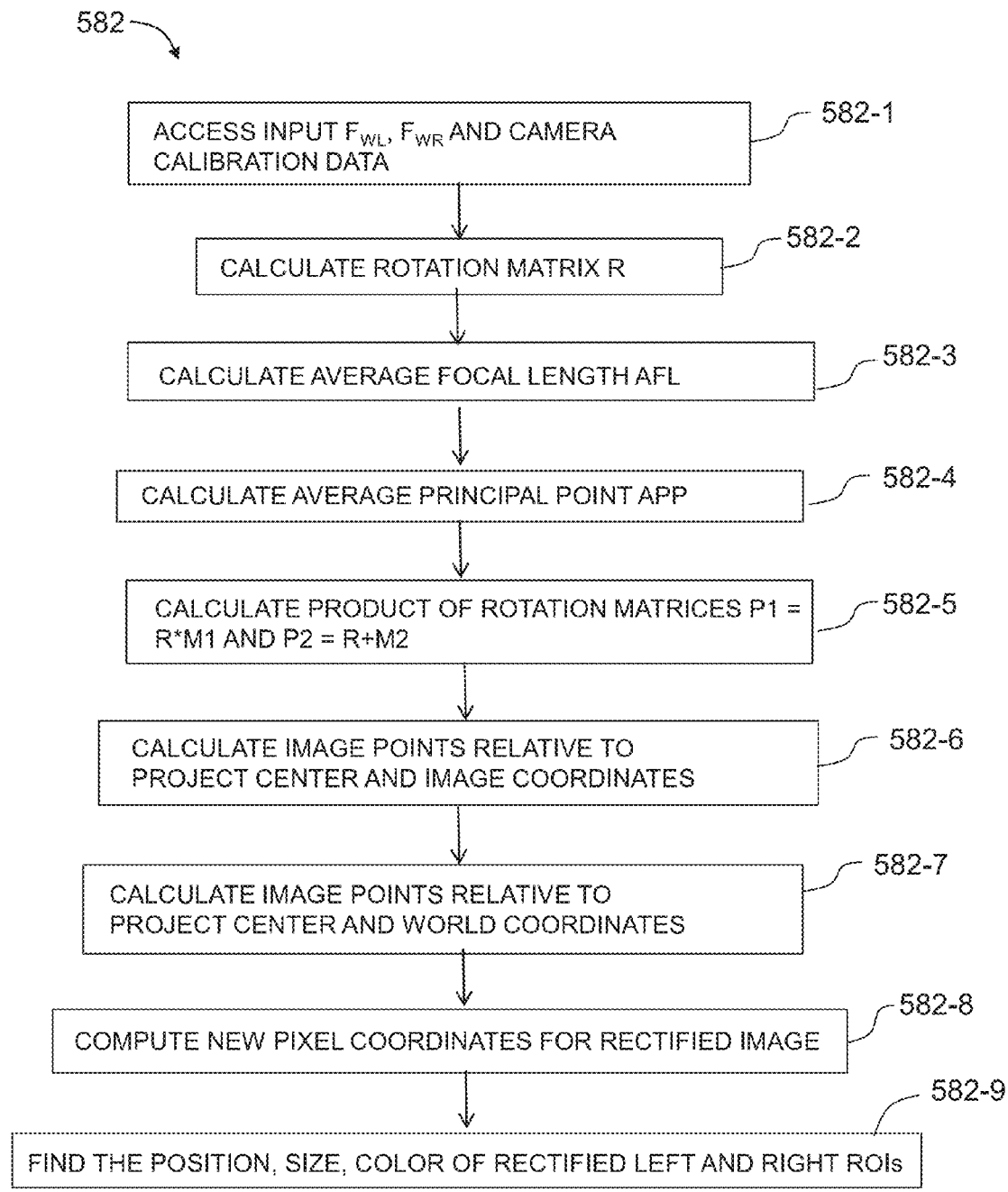
FIG. 13B shows a flow diagram that sets forth an example method of performing image rectification for 2D images of a scene captured with different cameras from different positions and orientations.

The image rectification step 582 discussed above in connection with flow diagram 580 is now discussed in greater detail by expanding step 582 into a flow diagram set forth in FIG. 13B. Thus, step 582-1 involves accessing the left and right input images (frames) $F_{WL}$ an $F_{WR}$ from first output file FILE-1.ccc, as well as accessing the camera calibration data.

In step 582-2, for each input image (frame), a rotation matrix R is computed from the image coordinates to the reference (world) coordinates using rotation angles M=($\omega$, $\phi$, k) in the calibration data for each camera. The rotation angles for the left and right cameras are respectively defined by M1 and M2. The rectification rotation matrix R for the image pair (frame pair) can be calculated as follows: First, let e1, e2 and e3 be three 3D vectors, given by as follows:

e1=projection center of second camera–projection center of first camera
    e1=e1/(magnitude of e1)
    e2=sum of third column of the rotation matrix of the two images
    e2=e2×e1, where × stands for cross product
    e2=e2/(magnitude of e2)
    e3=e1×e2
    e3=e3/(magnitude of e3)

Then the rectification rotation matrix R is formed by column vectors e1, e2 and e3.

Next, in step 582-3, the average focal length AFL is calculated as follows:

$$ALF=((CC1/PS1)+(CC2/PS2))*(\text{size percentage})/2$$

where CC1 and CC2 are the camera constants for the first and second cameras and PS1 and PS2 are the pixel sizes for the images for the first and second cameras, and the size percentage. The size percentage can be selected to be 100% of the actual image size or any other percentage, usually smaller (e.g., 50%), which makes the point cloud smaller and more dense.

Next in step 582-4, the average principal point APP is calculated as follows:

$$APP=((PP1/PS1)+(PP2/\{S2))*(\text{size percentage})/2$$

where PP1 and PP2 are the principal points for the first and second cameras.

Next in step 582-5, for each image, the product matrices P1 and P2 are calculated using the rotation matrices, i.e., the angle matrices M1 and M2, and the rectification rotation matrix R, via the relationships P1=R*M1; P2=: R*M2.

Next in step 582-6, for each input image and for each pixel (x, y) in the input image, the image point relative to project center (i.e., principal point) and with respect to the image coordinates using camera calibration parameters A, B, K1, K2, P1, P2 is calculated as follows:

Let x'=x*(PS)−(PPx) where PS=pixel size, PPx=x-coordinate of the principal point PP
    Let y'=y*(PS)−(PPy) PPy=x-coordinate of the principal point PP
    Let radial distortion factor=r=K1*s+K2*s*s, where s=x'$^2$+y'$^2$
    Let tangential distortion factor=t=2*x'*y'

Then the x, y, z-coordinates of image point are given by:

$$x''=x'+A*y'+r*x'+P2*t+P1*(s+2*x'^2),$$

$$y''=y'+B*x'+r*y'+P1*t+P2*(s+2*y'^2).$$

$$z''=\text{camera constant}$$

Next in 582-7, the image point IP'''=(x''', y''', z''') relative to project center and with respect to the world coordinates is calculated by applying the matrix P1 or P2 on the column vector of IP''=(x'', y'' and z''), i.e., IP'''=P1*IP'' or IP'''=P2*IP''.

Next in 582-8, the new pixel coordinates for the rectified image are computed as follows:

$$x=(APPx)-(AFL)*x'''/z'''$$

$$y=(APPy)-(AFL)*y'''/z'''$$

where APPx and APPy are the x and y coordinates of the average principle point.

Then step 582-9 involves finding the position, size and color of the rectified left and right ROIs. This involves an inverse-mapping process for each rectified image and for each pixel (x, y) in the rectified ROI in the rectified image. Specifically, the rectified image is inverse-mapped back to the input image by iteratively moving towards the closest pixel in input image, and then finding the sub-pixel ratios. For each pixel (x, y) in the rectified image, the closest pixel and sub-pixel ratios are used to determine the color of that pixel. The output comprises left and right rectified images with ROIs, with color values (RGB) at each pixel, namely voxels (x, y; RGB).

Making a 3D Stereo Image or Movie

Figure 17:
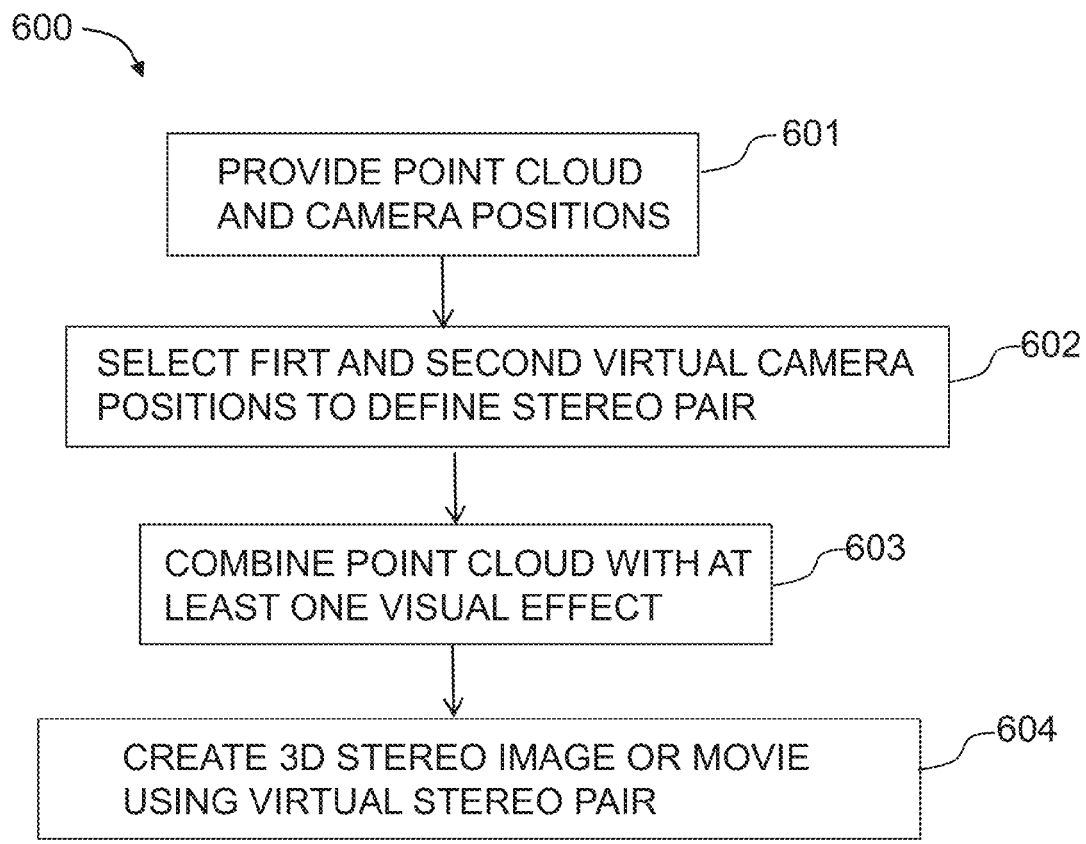
FIG. 17 is a flow diagram that sets forth an example method of forming a 3D image or a 3D movie from the point cloud data and the camera positions used to capture the image data used to form the point cloud.
Figure 18:
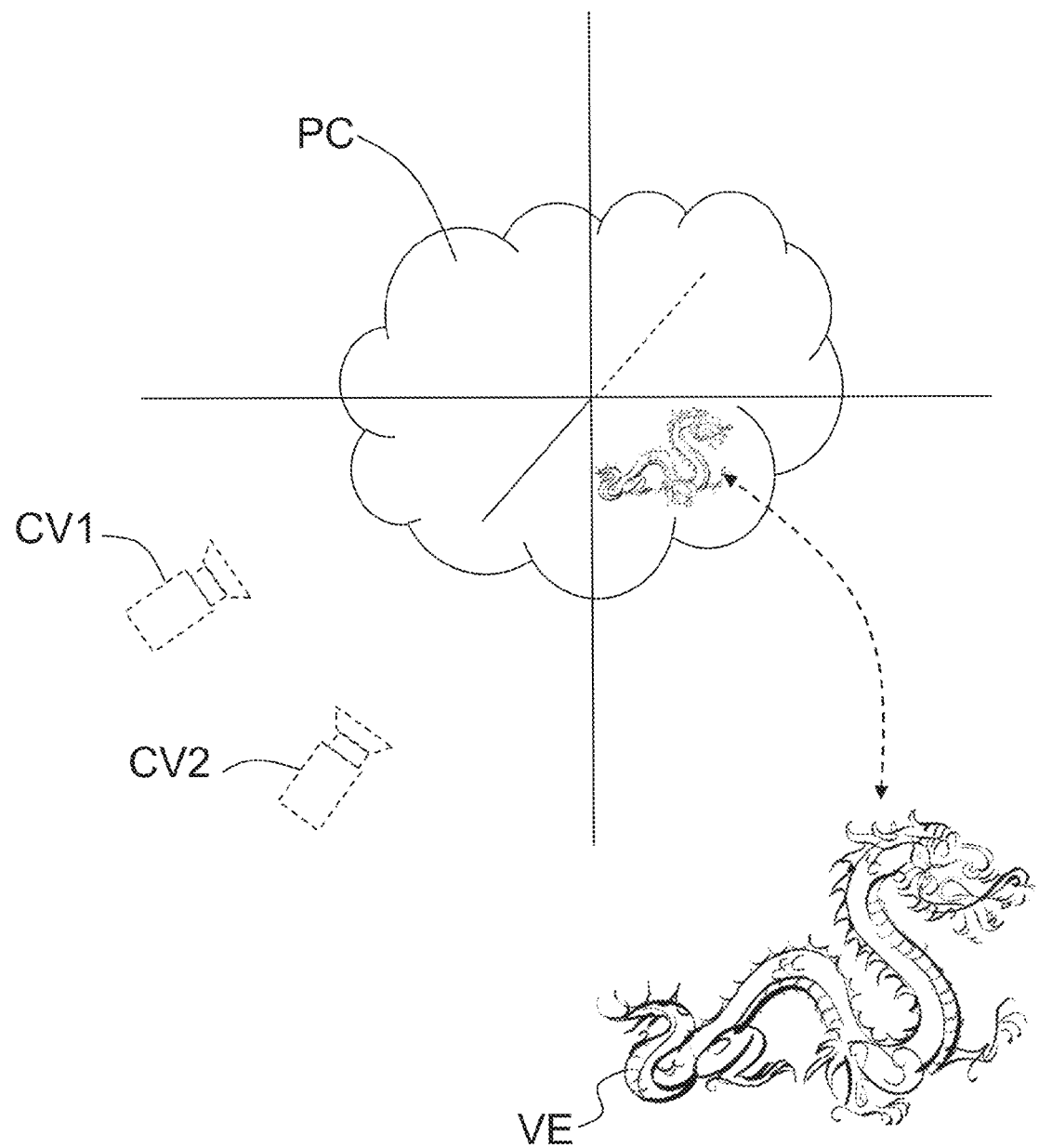
FIG. 18 is a diagram that schematically illustrates the method step of defining virtual camera positions with respect to a point cloud formed using the methods described herein, and also schematically illustrates the addition to the point cloud of a visual effect.

An aspect of the disclosure involves making a 3D stereo image or a 3D stereo movie (i.e., a sequence of 3D stereo images) using the point cloud data, range data, or an image-based displacement map. FIG. 17 sets forth a flow diagram of an example method of forming 3D stereo image or movie. In step 601, the point cloud data and the camera positions used to obtain the point cloud data are provided. Then, in step 602, first and second virtual camera positions are selected, thereby defining a 3D stereo pair. This replicates a stereo rig and allows for arbitrary 3D virtual filming of the scene as a post-processing step. This step 602 is schematically represented in FIG. 18, which shows a point cloud PC and first and second virtual cameras CV1 and CV2.

A second technique to create a 3D stereo separate pair (Left and Right eyes) from a 2D image is to horizontally displace (warp) the pixels in a horizontal direction by a specific amount. This amount differs between the two left and right eyes, creating the illusion of stereo depth. The amount of horizontal displacement is informed by both the range data of the corresponding pixol and the stereo volume required for the creative specifics of the shot.

Step 603 includes the optional step of combining the point cloud with at least one visual effect to enhance the 3D stereo image or 3D stereo movie formed as described above. Example visual effects include computer graphics, computer animation, hand-drawn animation, computer-generated environments, computer-generated or hand-drawn imagery, computer-generated objects, and the like. Generally, a visual effect means any additional information added to the point cloud. FIG. 18 illustrates schematically the addition to point cloud PC of a visual effect VE in the form of an animated dragon by way of a simple example.

In step 604, the 3D stereo image or movie is created using the selected positions of the first and second virtual cameras. In post-production, 3D stereo images are created (left and right eyes) from 2D imagery using one of two primary techniques. The first method is to re-create a virtual version of a two-camera 3D stereo rig in CG. This virtual 3D stereo rig has the same controls at its physical (real) counterpart for creating stereo photography, i.e., convergence and setting of the inter-axial distance between virtual cameras. The 2D imagery is projected as a texture map onto a polygonal geometry mesh, which is created from the point cloud data embedded in each frame. This texture map of the 2D live action is physically displaced and projected onto this geometry. The 2D imagery has now been given shape by the geometry, which is a true 3D view of the scene as photographed from point of view of the production camera and one or more attendant witness cameras. The virtual 3D stereo rig is then used to virtually re-photograph this frame, thereby producing a discreet left and right eye element for stereo viewing.

A second method is to use the depth information stored in each pixol, which contains the X, Y, Z information for the voxel-based image. As described above, a 3D stereo image can be created from a 2D image by re-positioning the pixels of the image in a horizontal manner, thereby creating two separate images (left & right eyes). The amount of horizontal displacement is informed by both the range data of the corresponding pixol and the stereo volume required for the creative specifics of the shot.

In an example, forming the 3D stereo movie includes making one or more critical 3D-stereo-related decisions such as camera position, orientations, convergence angles, panning, etc., in post-production rather at the time of capturing the 2D images. Thus, an aspect of the disclosure includes relaxing the conditions under which the original 2D cinemagraphic images are captured. This simplifies the filming process for the movie on location and allows for much greater creative freedom to shape the movie in the post-production phase. This also saves substantial time and cost in making a 3D stereo movie.

Algorithms

Several algorithms related to carrying out different aspects of the invention are now described below in more detail and in an abbreviated format that is familiar to those skilled in the art.

Image Rectification for the Regions of Interest (ROIs)

Input:

Left and right input images

ROIs on the input images

Calibration data for the left and right cameras

Output:

Left and right rectified image of ROI with color values at each pixel

Process:

1. Map the ROIs on input images into ROIs on rectified images:

1.1 For each input image, compute rotation matrix from image to world using Omega, Phi and Kappa in the calibration data for each camera. Call them M1 and M2.

1.2 Compute the rectification rotation matrix R for the image pair:

Let e1, e2 and e3 be three 3D vectors, given by:

e1=: projection centre of second camera−projection centre of first camera e1=: e1/(magnitude of e1)

e2=: sum of third column of the rotation matrix of the two images found in 1.1 e2=: e2×e1, where × stands for cross product e2=: e2/(magnitude of e2)

e3=: e1×e2 e3=: e3/(magnitude of e3)

Then the rectification rotation matrix is formed by column vectors e1, e2 and e3

1.3 Compute:

Average focal length=:((camera constant/pixel size of first image)+(camera constant/pixel size of first image))*(size percentage)/2

Average principal point=:((principal point/pixel size of first image)+(principal point/pixel size of first image))*(size percentage)/2

1.4 For each image, find product matrices:
   P0=: R*M0; P1=: R*M1

1.5. For each input image, for each pixel (x, y) in the image:

1.5.1 Compute image point relative to project centre (w.r.t. image) using camera calibration parameters A, B, K1, K2, P1, P2:

Let x':=: x*(pixel size)−(x coordinate of principal point)
Let y':=: y*(pixel size)−(y coordinate of principal point)
Let radial distortion factor=r=: K1*s+K2*s*s, where s=x'^2+y'^2
Let tangential distortion factor=t=: 2*x'*y'
Then the x, y, z-coordinates of image point are given by:

$$x''=:x'+A*y'+r*x'+P2*t+P1*(s+2*x'^2),$$

$$y''=:y'+B*x'+r*y'+P1*t+P2*(s+2*y'^2).$$

$$z''=:\text{camera constant}$$

1.5.2 Compute image point (x''', y''', z''') relative to project centre (w.r.t. world) by applying the matrix P0 or P1 on the column vector of x'', y'' and z''
1.5.3 Compute new pixel coordinates on rectified image as:

$$x\text{-coord}=:(x\text{-coord of average principal point})-(\text{average focal length})*x'''/z'''$$

$$y\text{-coord}=:(y\text{-coord of average principal point})-(\text{average focal length})*y'''/z'''$$

1.6 Using 1.5, find the position and size of the rectified left and right ROIs
2. For each rectified image, for each pixel (x, y) in the rectified ROI on the image, inverse-map it back to the input image by iteratively moving towards the closest pixel in input image, and then finding the subpixel ratios.
3. For each rectified image, for each pixel (x, y), use the closest pixel and subpixel ratios to determine the color of that pixel.
Spatial Intersection
Input:
Left and right rectified images of ROI
Disparity values at each pixel in left rectified image (defined as difference between x-subpixel-coordinate of a pixel on left rectified image, and that of the corresponding pixel on the right rectified image)
Calibration data for the left and right cameras
Threshold for distance between a pair of rays
Output:
Point cloud with (x, y, z) world coordinates of the point corresponding to each pixel in the left rectified image
Process:
1. For each input image, compute rotation matrix from image to world using Omega, Phi and Kappa. Call them M1 and M2.
2. For each pixel on the left rectified image:
2.1 Inverse-map the pixel back to the left input image (see Rectification Step 2)
2.2 Find the corresponding pixel on the right rectified image by disparity value, and inverse-map it back to the right input image
2.3 For each of left and right pixels found above:
2.3.1 Compute image point relative to projection centre (w.r.t. image) (see Rectification Step 1.5.1)
2.3.2 Compute image point relative to projection centre (w.r.t. world) by applying rotation matrix on column vector of the result of 2.3.1. Denote these relative position vectors by p1 and p2 for left and right pixels respectively.
2.4 Find the point of intersection by analytic geometry:
Let d=: project centre of second camera−projection centre of first camera
Let the common normal be n=: p1×p2
Let a1=: (d×p2)·n/(n·n) and a2=: (d×p1)·n/(n·n) where · stands for dot product.
So, the spatial intersection for left and right are given by (q1+q2)/2, where $$q1=:(\text{projection centre of first camera})-a1*p1$$

$$q2=:(\text{projection centre of first camera})-a2*p2$$

only if the distance between q1 and q2 is less than the given threshold.
Middle Image Mapping
Input:
Left and right rectified images of ROI
Set D of disparity values at each pixel in left rectified image
Calibration data for the left and right cameras
Point cloud C formed from the left and right rectified images by Spatial Intersection algorithm above
Middle image
Calibration data for the middle camera
Aberration correction parameters for middle camera
Threshold for distance between adjacent subpixels in middle image
Output:
Disparity values for each pixel in the middle image (if that pixel maps inside the point cloud) Point cloud with (x, y, z) world coordinates of the point corresponding to each pixel in the middle image
Process:
1. Map the given point cloud C into the middle image:
1.1 Compute rotation matrix from middle image to world using Omega, Phi and Kappa in the calibration data for the middle camera.
1.2 For each vertex in C, find its corresponding subpixel coordinates on the middle image:
1.2.1 Transform the position P of the vertex to the corresponding point Q the middle image (both in world coordinates):
Let p=: position vector of P relative to projection centre (w.r.t. world)=position of P−projection centre
Then position vector of Q is obtained by applying rotation matrix on p.
1.2.2 The image subpixel coordinates of the pixel corresponding to P is given by:

$$x\text{-subpixel-coord}=:x+(x\text{-coord of principal point})/(\text{pixel size});$$

$$y\text{-subpixel-coord}=:y+(y\text{-coord of principal point})/(\text{pixel size});$$

where x=: −(x coord of Q)/(z coord of Q)*(camera constant of middle image)+aberration correction
and y=: −(y coord of Q)/(z coord of Q)*(camera constant of middle image)+aberration correction
1.2.3 Record the vertex in C and the disparity values in D for subpixel.
1.3 The set S of middle image subpixels formed in 1.2 is then processed to remove isolated subpixels whose distance from its nearest subpixel exceeds the given threshold.
1.4 For each pixel in the middle image, find three subpixels in S closest to it, and the points in C and disparities in D for these three subpixels, recorded in 1.2.3. Then use a real interpolation to determine the (x, y, z) of the point and disparity for that pixel.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents, which claims are incorporated into and constitute part of this specification.

What is claimed is:

1. A method of defining a voxel-based image or a point cloud using two-dimensional (2D) images of a scene, comprising:
    establishing one or more camera parameters for first and second digital cameras each having pixels;
    performing a calibration of the first and second digital cameras based on the one or more camera parameters of the first and second digital cameras;
    registering the first and second digital cameras relative to a reference coordinate system to sub-pixel resolution;
    simultaneously capturing with the first and second digital cameras respective initial first and second 2D images of the scene;
    rectifying the initial first and second 2D images to sub-pixel resolution using photogrammetric triangulation to form rectified first and second 2D images;
    stereo-matching the rectified first and second 2D images to form sub-pixel-resolution, stereo-matched first and second 2D images;
    defining first and second regions of interest (ROIs) of the sub-pixel-resolution, stereo-matched first and second 2D images;
    inverse mapping the first and second ROIs to their corresponding initial first and second 2D images to sub-pixel resolution to find (x, y) positions and red, green and blue (RGB) color values for pixels in each of the first and second ROIs, thereby defining sub-pixel-resolution, first and second ROIs;
    using the sub-pixel-resolution first and second ROIs to form a sub-pixel-resolution disparity map that relates distance information in the scene relative to the reference coordinate system; and
    performing a spatial intersection of the sub-pixel-resolution first and second ROIs using the sub-pixel-resolution disparity map to define either a voxel-based image or a point cloud in the first digital camera.

2. The method of claim 1, wherein the disparity map has at least a 16-bit gray-scale dynamic range.

3. The method of claim 1, wherein forming the disparity map includes performing photogrammetric triangulation.

4. The method of claim 1, further comprising:
    defining first and second virtual cameras for the 3D point cloud to define a stereo camera pair.

5. The method of claim 1, further comprising combining either the point cloud or voxel-based image with at least one visual effect.

6. The method of claim 5, wherein the at least one visual effect is selected from the group of visual effects comprising: a computer-generated object, an animated object and a computer-generated environment.

7. The method of claim 1, further comprising employing a third digital camera, and using the first digital camera as a cinemagraphic camera and the second and third digital cameras as witness cameras that capture spatial data of the scene.

8. The method of claim 1, wherein the one or more camera parameters include lens distortion, sensor position, principal point and nodal point locations, and F-stop versus focal length variations.

9. The method of claim 1, wherein registering the first and second digital cameras includes capturing with the first and second digital cameras test images of test objects.

10. The method of claim 1, wherein the scene includes an object, wherein the first and second digital cameras have a camera spacing DS and an object-to-camera distance DC, and wherein the ratio DS/DC is greater than $1/10$.

11. The method of claim 10, wherein the ratio DS/DC has a maximum of $1/4$.

12. The method of claim 11, further including supporting the first and second digital cameras on a rail of an adjustable camera support device.

13. The method of claim 1, wherein performing the calibration includes collecting calibration data, and wherein the method includes applying the calibration data to the initial first and second initial images to reduce or eliminate differences in the initial first and second initial images due differences the first and second digital cameras.

14. The method of claim 1, wherein the pixels of the first and second digital cameras have the same size.

15. The method of claim 1, wherein registering the first and second digital cameras includes capturing an image of the first and second digital cameras with a registration camera.

16. The method of claim 1, wherein the first and second digital cameras have respective first and second fields of view that are the same.

* * * * *